United States Patent [19]
Moriyama

[11] Patent Number: 4,662,724
[45] Date of Patent: May 5, 1987

[54] TELEPHOTO ZOOM LENS

[75] Inventor: Keiji Moriyama, Komae, Japan

[73] Assignee: Nippon Kogaku K. K., Tokyo, Japan

[21] Appl. No.: 734,707

[22] Filed: May 16, 1985

[30] Foreign Application Priority Data

May 22, 1984 [JP] Japan .................................. 59-102810
May 22, 1984 [JP] Japan .................................. 59-102811

[51] Int. Cl.⁴ .......................... G02B 9/64; G02B 15/16
[52] U.S. Cl. .................................................... 350/427
[58] Field of Search ................................. 350/427, 423

[56] References Cited

FOREIGN PATENT DOCUMENTS 0161824 10/1982 Japan .................................. 350/423
0143313 8/1983 Japan .

Primary Examiner—John K. Corbin
Assistant Examiner—Rebecca D. Gass
Attorney, Agent, or Firm—Shapiro and Shapiro

[57] ABSTRACT

A zoom lens consists of a first lens group of positive refractive power, a second lens group of negative refractive power, a third lens group of positive refractive power and a fourth lens group of positive refractive power arranged in the named order from the object side. A zoom lens is characterized in that as the second lens group, there is used a lens group comprising a first cemented lens component composed of a positive and negative lens elements cemented together and having a negative composite refractive power and a second cemented lens component composed of negative and positive lens elements cemented together and having a negative composite refractive power arranged in the named order from the object side, and in that in the first cemented lens component of the second lens group there is provided a cemented surface having a negative refractive power thereby preventing the increase of coma at the wide angle side while reducing the variation of coma with magnification change and also increasing the negative refractive power of the second lens group which enables to realize a compact construction of the zoom lens.

23 Claims, 33 Drawing Figures

SPHERICAL ABERRATION

ASTIGMATISM

DISTORTION

COMA

SPHERICAL ABERRATION

ASTIGMATISM

DISTORTION

COMA

SPHERICAL ABERRATION

ASTIGMATISM

DISTORTION

COMA

SPHERICAL ABERRATION

ASTIGMATISM

DISTORTION

COMA

SPHERICAL ABERRATION

ASTIGMATISM

DISTORTION

COMA

SPHERICAL ABERRATION

ASTIGMATISM

DISTORTION

COMA

SPHERICAL ABERRATION

ASTIGMATISM

DISTORTION

COMA

TELEPHOTO ZOOM LENS

BACKGROUND OF THE INVENTION

1. Field of the Invention

The present invention relates to a telephoto zoom lens consisting of four lens groups, namely positive, negative, positive and positive lens groups arranged in the named order from the object side.

2. Description of the Prior Art

The above-mentioned type of zoom lens is known in the art but has many drawbacks.

In the known zoom lens, the magnification change of the image is achieved by moving the first and fourth lens groups together in the direction toward the object side while correcting the image position by the third lens group. Herein, the first lens group means the lens group nearest to the object side and the fourth lens group means the lens group nearest to the image side. One of the important problems involved in this type of the known zoom lens is the variation of aberrations, especially that of coma. With the movement of the fourth lens group during the magnification change the exit angle of oblique light beam varies and therefore the off-axial aberrations vary very much with magnification change. Because of it, at the telephoto side there is produced a great deal of internal coma which is very difficult to correct well.

In order to compensate the variation of image plane caused by magnification change it has been proposed to provide the negative lens component at the object side of the second lens group with a cemented surface having a positive refractive power. Such a modification of the zoom lens is disclosed, for example, in Japanese laid-open Patent Application No. 143,313/1983. However, this modified known zoom lens also has some disadvantages. With the arrangement, it is no longer possible to increase up the refractive power of the second lens group, which is against the general desire for compact structure of the whole system. In addition, it renders the coma excessive at the wide angle side. Consequently, the image forming performance is remarkably degraded by the large variation of coma with the magnification change.

Another important problem of the known zoom lens is the variation of F-number with magnification change. Since the fourth lens group has to be moved a large distance for magnification change, the variation of F-number is inevitable in the known lens system. Especially in those zoom lenses which have high magnifications, the variation of F-number is remarkedly large. Therefore, the freedom available for the correction of aberrations is almost used out for another purpose of reserving the brightness on the wide angle side. On the telephoto side, the lens system is necessarily made as a dark lens. This disadvantage may be overcome by continuously changing the opening of aperture stop during magnification change. However, it needs a complicated mechanical structure which is entirely against the general desire for the reduction of size and manufacturing cost of such zoom lenses.

SUMMARY OF THE INVENTION

Accordingly, it is an object of the invention to provide a telephoto zoom lens which is compact in structure and has good image forming performance throughout the variation range of magnification.

It is another object of the invention to provide a telephoto zoom lens in which the variation of F-number, that is, the brightness of the lens system with magnification change is very small as compared with the prior art ones and which needs no complicated mechanism for changing the opening of aperture stop.

In order to attain the above objects, the present invention provides a zoom lens consisting of a first lens group of positive refractive power, a second lens group of negative refractive power, a third lens group of positive refractive power and a fourth lens group of positive refractive power arranged in the named order from the object side, which is characterized in that, as the second lens group, there is used a lens group comprising a first cemented lens component composed of a positive and negative lens elements cemented together and having a negative composite refractive power and a second cemented lens component composed of negative and positive lens elements cemented together and having a negative composite refractive power arranged in the named order from the object side, and in that in the first cemented lens component of the second lens group there is provided a cemented surface having a negative refractive power thereby preventing the increase of coma at the wide angle side while reducing the variation of coma with magnification change and also increasing the negative refractive power of the second lens group which enables to realize a compact construction of the zoom lens.

According to another feature of the invention to attain the above objects, the first and fourth lens groups are moved toward the object side for the magnification change from wide angle end to telephoto end and the third lens group is moved also toward the object side but in a non-linear fashion whilst keeping the second lens stationary relative to the image plane in such manner as to satisfy the conditions:

$$x_4 = k \cdot x_1$$

$$0.4 \leq k \leq 0.8$$

wherein, $x_1$ and $x_4$ are amounts of displacement of the first and fourth lens groups in any position of focal length from the wide angle end as the base.

DETAILED DESCRIPTION OF THE PREFERRED EMBODIMENTS

Figure 1:
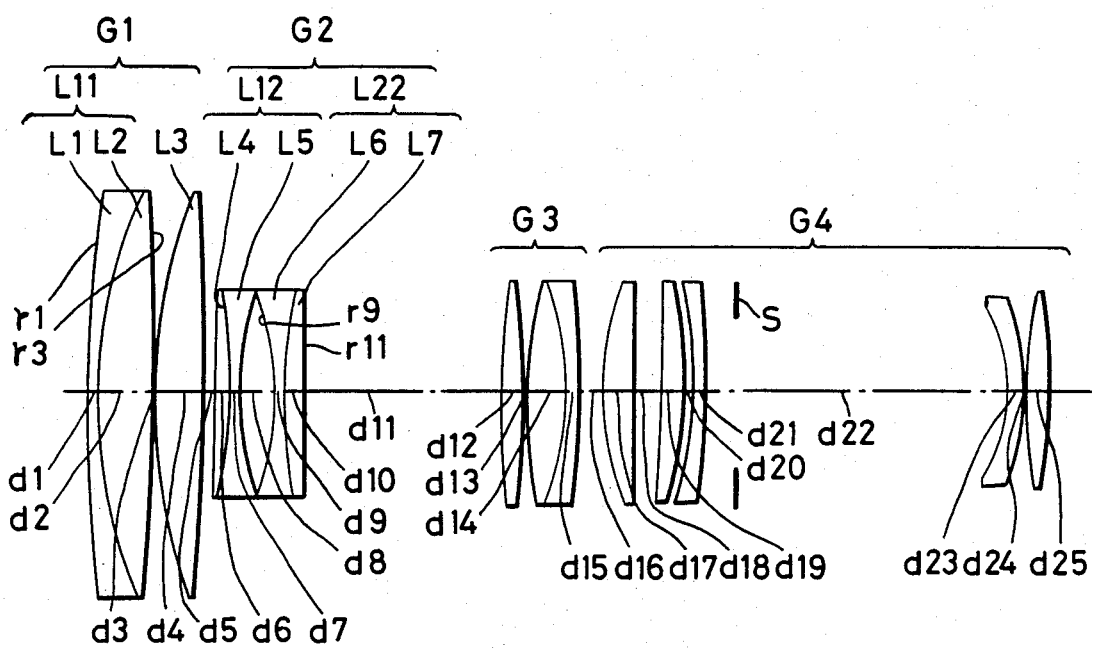
FIG. 1 schematically shows the construction of the lens according to the first to fifth embodiments of the invention.

FIG. 1 schematically shows the basic arrangement of the components of the telephoto zoom lens according to the invention.

The lens consists of four lens groups G1, G2, G3 and G4 arranged in this order from the object side. The first lens group G1 has a positive refractive power, the second one G2 does a negative refractive power, the third one G3 does a positive refractive power and the fourth one G4 has a positive refractive power. When the magnification of image of the zoom lens is changed from wide angle end to telephoto end, the first lens group G1 is moved toward the object side linearly and the second lens group G2 is remained stationary relative to the image plane. The third lens group G3 is moved toward the object side nonlinearly and the fourth lens group G4 is also moved toward the object side approximately in a linear fashion.

The second lens group G2 comprises a first cemented lens component L21 composed of positive and negative lens elements L4 and L5 cemented together and having a negative composite refractive power, and a second cemented lens component L22 composed of negative and positive lens elements L6 and L7 cemented together and having a negative composite refractive power, arranged in the named order from the object side. The second lens group is so designed so as to satisfy the following conditions:

$$0.02 < N_5 - N_4 < 0.3 \quad (1)$$

$$0.25 < N_7 - N_6 < 0.4 \quad (2)$$

$$1.05 < (r_{11} + r_9)/(r_{11} - r_9) < 1.45 \quad (3)$$

$$0.3 < f_{21}/f_{22} < 0.5 \quad (4)$$

wherein, $f_{21}$ and $f_{22}$ are focal lengths of the first and second cemented lens components L21 and L22;

$N_4$ and $N_5$ are refractive indexes of the positive and negative lens elements L4 and L5 of the first cemented lens component;

$N_6$ and $N_7$ are refractive indexes of the negative and positive lens elements L6 and L7 of the second cemented lens component;

and $r_9$ and $r_{11}$ are the curvature radii of the lens surfaces of the object side and on the image side of the second cemented lens component L22.

As seen from the above, according to the invention, a cemented surface of negative refractive power is formed in the first cemented lens component L21 of the second lens group to prevent, among others, the increase of coma at the wide angle side and also minimize the variation of coma with magnification change. In addition, it serves also to increase the negative refractive power of the second lens group G2, which enables, therefore, to realize a compact construction of the lens.

The above conditions (1), (2), (3) and (4) particularly determined by the present invention will be described in detail.

The conditions (1) and (2) are essential to minimize the variation of coma with magnification change and to obtain a good balance of color aberration and Petzval sum. Where the value of $N_5 - N_4$ exceeds the upper limit of the condition (1), the negative refractive power of the cemented surface of the first component L21 of the second lens group G2 is rendered excessive and, therefore, in the area about the center of the view field on the wide angle side there is produced too much internal coma. When the lower limit of the condition (1) is exceeded, the coma at the wide angle side becomes excessively large.

Under these conditions, it is difficult to control the variation of coma caused by magnification change. Where the value of $N_7 - N_6$ is over the upper limit of the condition (2), Petzval sum is rendered excessively negative and there is produced a remarkedly large astigmatism on the telephoto side especially. When the lower limit of the condition (2) is exceeded, it is difficult to increase the difference between Abbe's numbers and the curvature of the cemented surface in the second cemented lens component is too strong. The spherical aberration of color on the telephoto side increases too much.

The conditions (3) and (4) are essential to obtain a good balance of spherical aberration and field curvature at magnification change. The condition (3) limits the form of the second cemented lens component L22 of the second lens group G2. When the upper limit is exceeded, both the spherical aberration and the field curvature on the telephoto side become excessively large and the spherical aberration on wide angle side becomes excessively negative. On the contrary when the lower limit is exceeded, the balance of aberrations get worse in the opposite direction to the above and it is difficult to keep the image forming performance of the zoom lens good. The last condition (4) limits the ratio of the focal length of the first cemented lens component L21 to that of the second one L22 in the second lens group G2. In other words, this condition limits the shares of refractive power which the two negative lens components should take respectively. Where the ratio is over the upper limit of the condition (4), the spherical aberration on the telephoto side is rendered excessively negative and the field curvature on the wide angle side is rendered excessively positive. If the ratio is under the lower limit of the condition (4), the aberrations are rendered excessive in the opposite direction to the above. In either case, it is very difficult to keep well-balanced spherical aberration and field curvature over the whole range of magnification change.

In a preferred embodiment of the above basic arrangement according to the invention, the first lens group G1 comprises a cemented lens component L11 composed of negative and positive lens elements L1 and L2 cemented together and having a positive composite refractive power, and a positive lens component L3. This structure of the first lens group improves the ability of focusing on a close object for which the first lens group G1 is to be moved toward the object along the optical axis. More preferably the first lens group is so designed as to satisfy the following conditions:

$$0.05 < f_3/f_{11} < 0.2 \qquad (5)$$

$$0.5 < (r_3 + r_1)/(r_3 - r_1) < 0.9 \qquad (6)$$

$$-0.2 < f_{11}\left(\frac{1}{f_1\nu_1} + \frac{1}{f_2\nu_2}\right) < -0.05 \qquad (7)$$

wherein
- $f_{11}$ and $f_3$ are focal lengths of the cemented positive lens component L11 and the positive lens component L3 respectively,
- $f_1$ and $f_2$ are focal lengths of the negative and positive lens elements L1 and L2 of the cemented positive lens component L11,
- $\nu_1$ and $\nu_2$ are Abbe's numbers of the lens elements L1 and L2,
- $r_1$ and $r_3$ are curvature radii of the lens surfaces on the object side and on the image side of the cemented positive lens component L11.

In the first lens group G1 designed in this manner, the cemented surface of the cemented positive lens component L11 is convex toward the object side. Therefore, chromatic aberrations, especially coma of color on the telephoto side and astigmatism of color can be corrected very effectively. In addition, it is possible to maintain the optical performance even for close objects. Consequently, this embodiment assures good and stable optical performance of the zoom lens.

The above conditions (5), (6) and (7) are essential for better correction of chromatic aberration, especially chromatic aberration on the telephoto side and for good balance of aberration variation over the range of from infinity to close-up. When the upper limit of the condition (5) is exceeded, both of spherical surface and astigmatism are rendered excessive on the telephoto side. The astigmatism in the position for close-up excessively moves in positive direction. When the lower limit of the condition (5) is exceeded, both of spherical aberration and astigmatism become excessively large in negative sign. In particular, the spherical aberration in the position for close-up excessively moves in negative direction. Where the upper limit of the condition (6) is exceeded, the spherical aberration on the telephoto side is rendered excessively negative and the astigmatism in the position for close-up is excessively moved in negative direction. On the contrary, when the lower limit of the condition (6) is exceeded, the spherical aberration is excessively large in positive sign on the telephoto side and the astigmatism in the position for close-up is excessive in positive sign. If the upper limit of the condition (7) is exceeded, the chromatic aberration on axis at the telephoto side is rendered excessively positive and the off-axial chromatic aberration is rendered excessively negative. On the contrary, if the lower limit of the condition (7) is exceeded, the aberrations are rendered worse in the opposite direction to the above. Excessive chromatic aberration is apt to generate.

Figure 2:
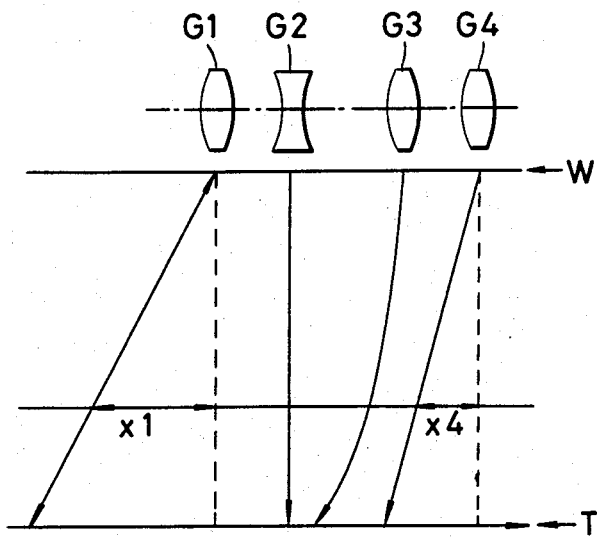
FIG. 2 shows the loci of movements of the lens groups in the embodiments.

FIG. 2 schematically shows a basic form of the telephoto zoom lens according to the invention and also shows the manner of movements of the respective lens groups.

Referring to FIG. 2, the telephoto zoom lens comprises four lens groups G1, G2, G3 and G4 arranged in the order of reference numeral from the object side.

The first lens group G1 is of positive refractive power, the second one G2 is of negative refractive power, the third one G3 is of positive refractive power and the fourth lens group G4 is of positive refractive power and provided with an aperture stop.

When the magnification is changed from wide angle end to telephoto end, the first and fourth lens groups G1 and G4 are moved toward the object side in a linear fashion and the third lens group G3 is moved toward the object side in a non-linear fashion while the second lens group G2 being stationary relative to the image plane in such manner as to satisfy the condition:

$$\left. \begin{array}{l} x_4 = k \cdot x_1 \\ 0.4 \leq k \leq 0.8 \end{array} \right) \qquad (8)$$

wherein, $x_1$ and $x_4$ are the amounts of displacement of the first and fourth lens groups G1 and G2 in any focal length position based on the wide angle end.

In this zoom lens system, the first, second and third lens groups G1, G2 and G3 do not constitute together an afocal system in the strict sense and the state of the exit beam from the third lens group G3 is variable. However, the system which the three lens groups G1, G2, G3 constitute together is basically a modification of the so-called afocal converter system. Therefore, the position of the aperture stop in this arrangement is advantageous for moderating the variation of off-axial aberrations as caused by magnification change. The stop is disposed in the fourth lens group immediately after the third lens group. As seen from FIG. 2, during the magnification change, the forth lens group moves relatively gently. It is obvious, therefore, that the above arrangement is very advantageous for better correction of aberrations.

Further advantages can be obtained when the fourth lens group is moved a smaller distance than the first lens group satisfying the above condition (8).

Firstly, it is possible to minimize the change of F-number with magnification change while keeping the opening of the stop constant. Secondly, the variation of exit angle of the beam from the fourth lens group is kept small, which enables more effective correction of variation in off-axial aberrations. Thirdly, the distance between the third and fourth lens groups is small and the distance can be further reduced on the wide angle side, which enables to further reduce the total size of the zoom lens system.

That the displacement of the fourth lens group is small, means that the fourth lens group is less contributive to the change of magnification. However, even for this arrangement, high magnification can be obtained by relatively increasing the displacement of the first lens group.

As described above, the condition (8) limits the amount of displacement of the fourth lens group within the most suitable range. When the upper limit of the condition is exceeded, the F-number varies in a wide range with the change of magnification so that the above-mentioned objects of the present invention are hardly attainable. When the lower limit of the condition (8) is exceeded, the principal ray of the beam having the maximum view angle is incident on the lens system at a position away from the optical axis. Therefore, it is required to increase the aperture of the lens, which is against the desire for compact structure of the lens system.

In a further preferred embodiment of the invention, the zoom lens satisfies the following conditions:

$$1.5 < f_{10}/fw < 2.5 \quad (9)$$

$$0.35 < |f_{20}/fw| < 0.55 \quad (10)$$

$$1.0 < f_{30}/fw < 1.4 \quad (11)$$

$$1.4 < f_{40}/fw < 1.7 \quad (12)$$

wherein, $f_{10}$, $f_{20}$, $f_{30}$ and $f_{40}$ are the focal lengths of the first, second, third and fourth lens groups respectively; and fw is the composite focal length of the total system at wide angle end.

As previously noted, the lens groups G1, G2 and G3 may be considered basically as an afocal system and the fourth lens group G4 may be considered as a relay lens system. The above condition (9) limits not only the focal length of the first lens group G1 but also the size of the lens groups G1, G2, G3 together working as the magnification changing system relative to the fourth lens group G4 substantially serving as a relay lens system. When the focal length ratio is over the upper limit of the condition (9), there is produced a great difficulty in realizing a compact lens system. Where it is under the lower limit of the condition (9), the Petzval sum is so excessively negative that the variation of aberrations with magnification change may be remarkedly large.

The condition (10) defines the focal length of the second lens group G2. When the upper limit of this condition is exceeded, the refractive power of the lens group G2 as a diverging group is so weakened that it is difficult to realize a compact construction of the minimum total lens length and the minimum aperture on the object side. If the lower limit of the condition is exceeded, there is produced aberrations too much by the second lens group. Also, the variation of aberrations is too large to be suitably controlable.

The condition (11) limits the focal length of the third lens group G3 which functions to correct the image position at magnification change. Since the refractive power of the third lens group G3 is determinative to the size required for the magnification changing system, the refractive power should be suitably selected considering the relation with the aberration correction. When the focal length is over the upper limit of the condition (11), it is difficult to reduce the total length of the magnification changing system in the desired range. When the lower limit of the condition is exceeded, the variation of aberrations, especially that of spherical aberration with magnification change is rendered excessively large.

The last condition (12) limits the focal length of the fourth lens group G4 which serves as a relay lens system. When the focal length exceeds the upper limit of the condition, the total length of the lens system is unacceptably long. When it is under the lower limit of the condition, the beam from the third lens groups G3 is refracted so strongly that the difficulty in correcting aberrations may be enhanced very much.

Figure 12:
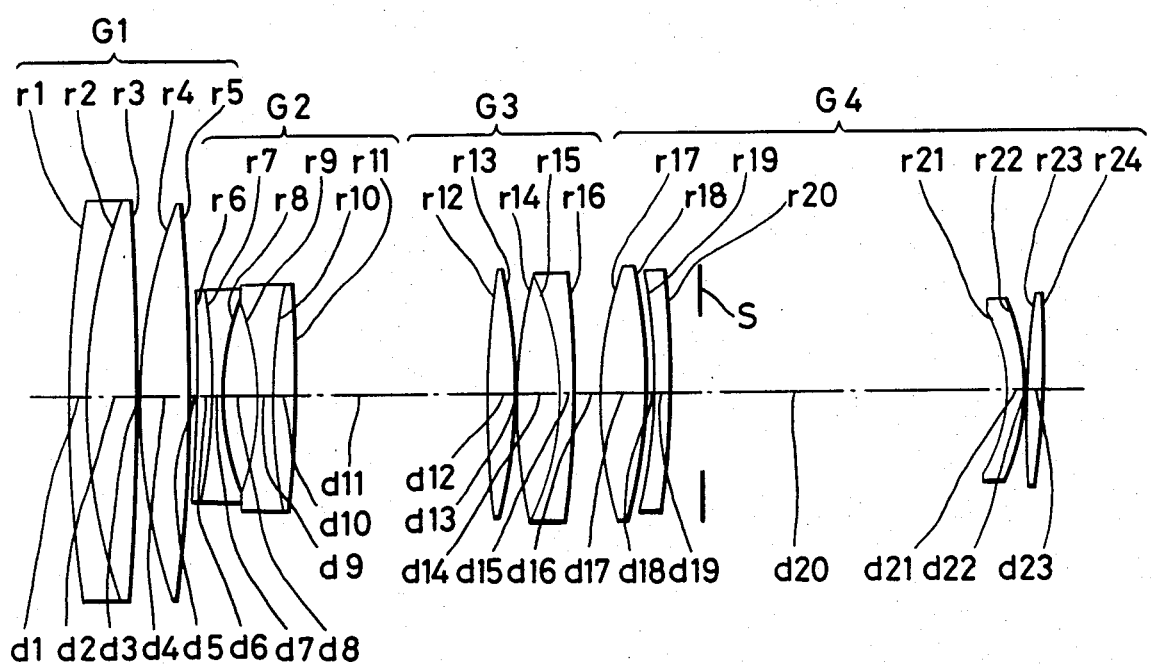
FIG. 12 schematically shows the concentration of the lens of the eighth and ninth embodiments.
Figure 13A:
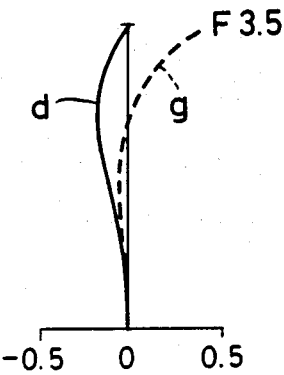
FIGS. 13A, 13B and 13C are aberration diagrams of the eighth embodiment.
Figure 13A:
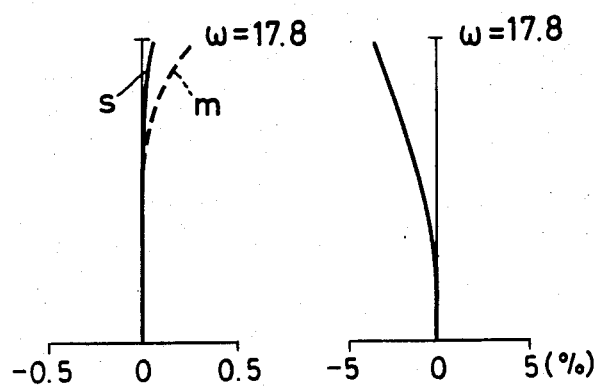
Figure 13A:
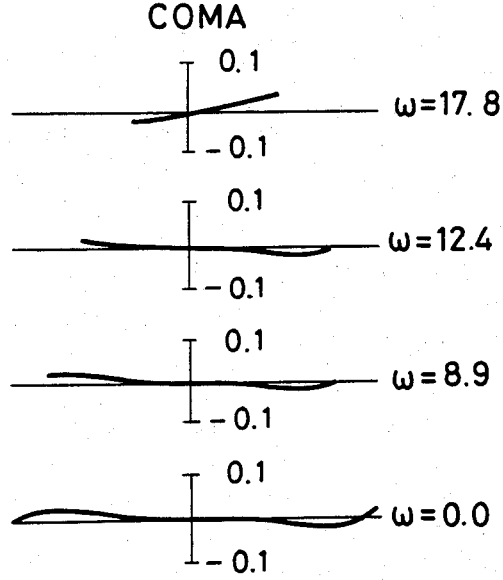
Figure 13B:
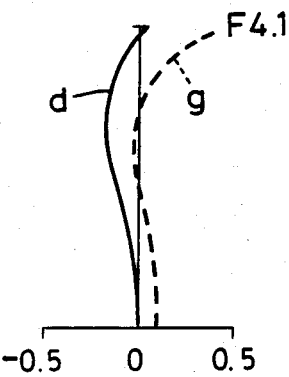
Figure 13B:
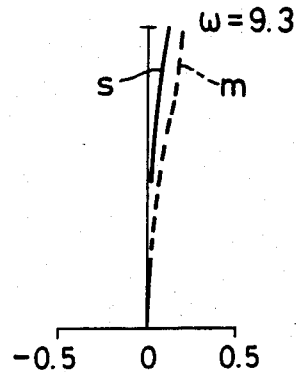
Figure 13B:
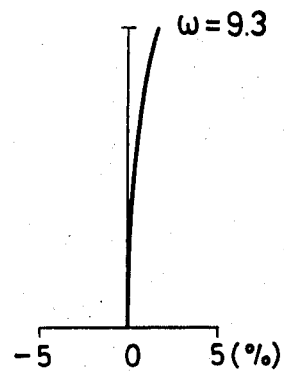
Figure 13B:
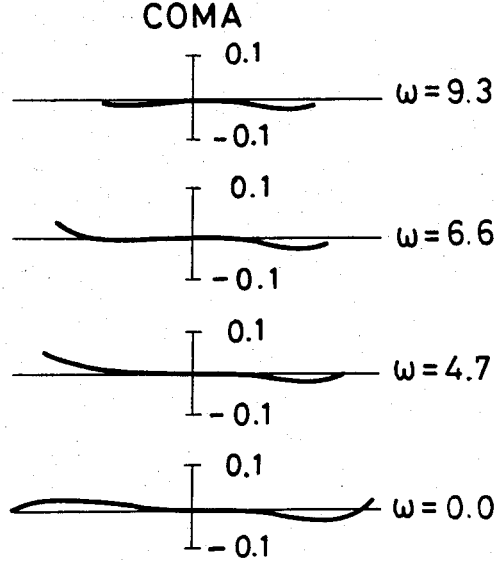
Figure 13C:
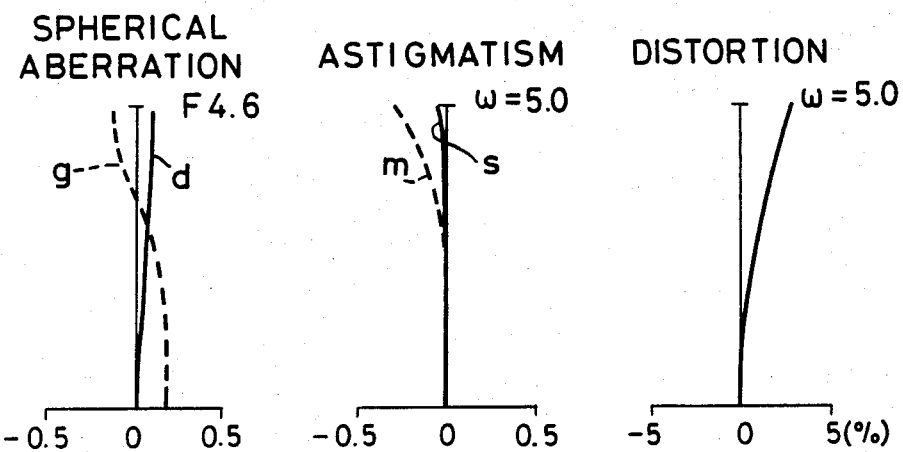
Figure 13C:
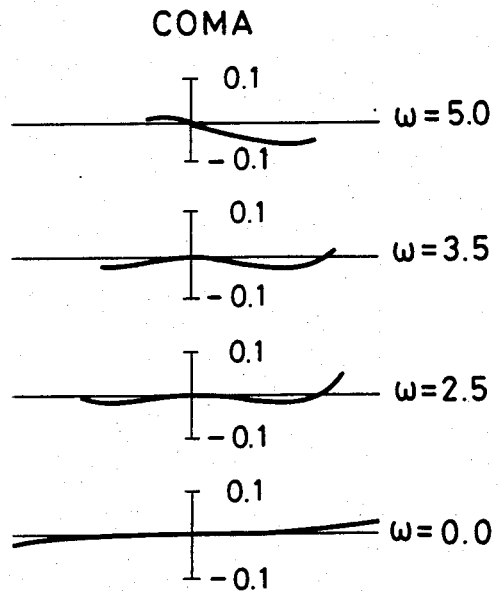
Figure 14A:
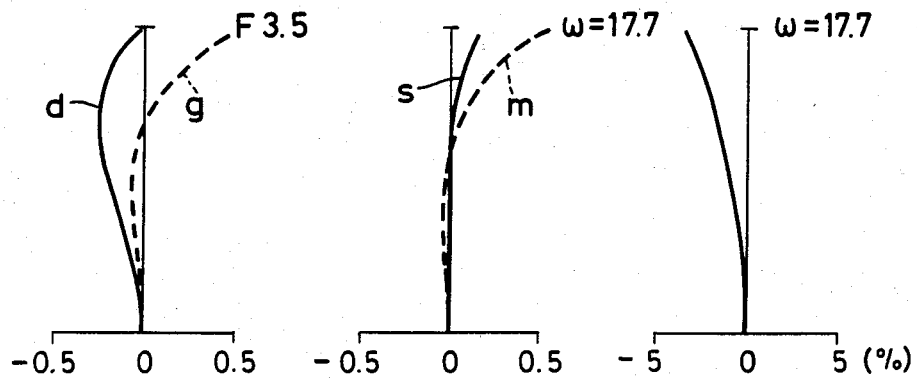
FIGS. 14A, 14B and 14C are aberration diagrams of the ninth embodiment.
Figure 14A:
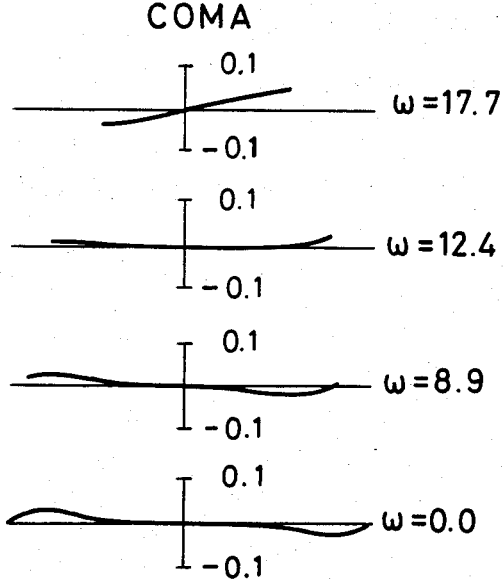
Figure 14B:
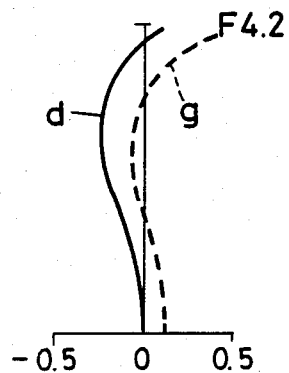
Figure 14B:
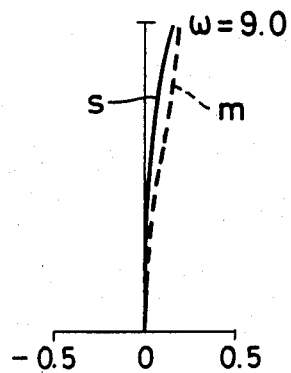
Figure 14B:
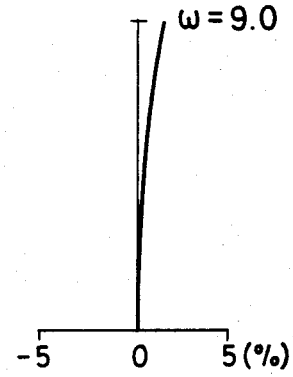
Figure 14B:
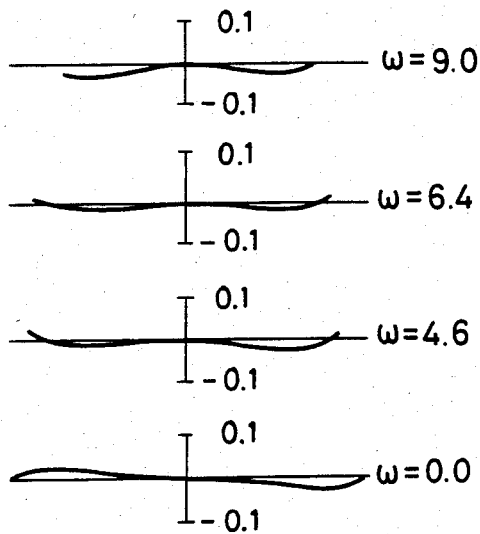
Figure 14C:
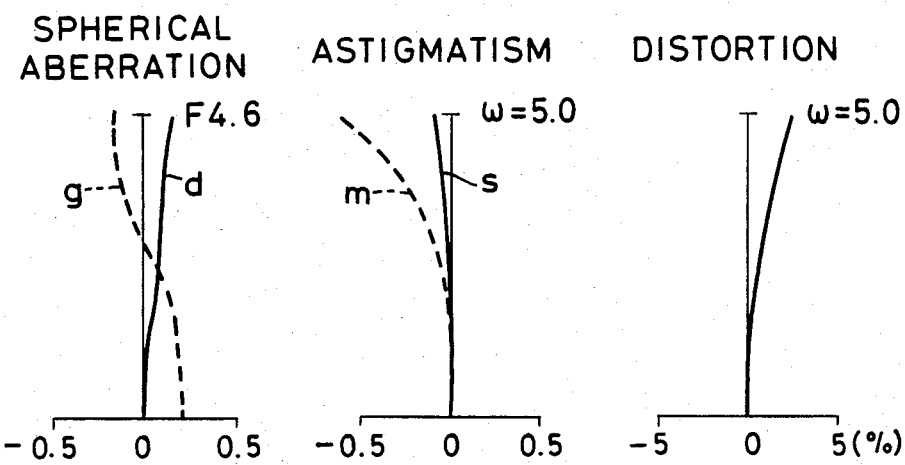
Figure 14C:
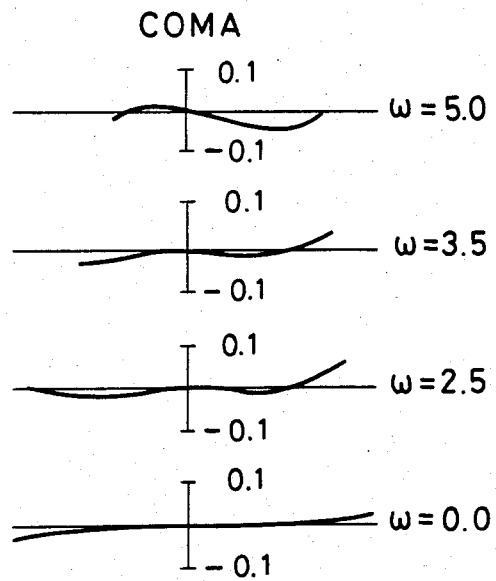

Hereinafter, preferred embodiments based on the basic structure previously shown in FIG. 1 will be shown as Examples 1, 2, 3, 4 and 5. In these embodiments, as seen in FIG. 1, the first lens group G1 is consisted of a cemented positive lens component (L11) and a biconvex positive lens component (L3). The composite refractive power of the first lens group G1 is positive in sign. The second lens group G2 is consisted of a cemented negative lens component (L21) and a cemented negative lens component (L22). The stronger curvature surface of the cemented negative lens component (L21) faces to the image side. The stronger curvature surface of the component (L22) faces to the object side. The composite refractive power of the second lens group G2 is negative. The third lens group G3 is consisted of a convexo-convex positive lens component and a positive lens component and has a positive composite refractive power. The fourth lens group G4 comprises a front group composed of a convexo-convex positive lens, a positive lens with its stronger curvature surface facing to the image side and a negative lens with its stronger curvature surface facing to the image side, and a rear group composed of a negative meniscus lens with its convexed surface facing to the image side and a positive lens. The front group of the fourth lens group G4 may be replaced by another structure of front group composed of a convexo-convex positive lens and a negative meniscus lens with its convex surface facing to the image side as in the case of Examples 8 and 9 shown in FIG. 12.

In the following tables of examples, the number in the first column is ordinal from the object side. f is the focal length of the whole lens system and Bf means the back-focus length.

EXAMPLE 1 f = 60.4 ~ 209.7
F-number: 3.5 ~ 4.6
k = 0.5

| No. | curvature radius r | center thickness air space between lenses d | refractive index n | Abbe's number ν | |
|---|---|---|---|---|---|
| 1 | 158.169 | 1.47 | 1.74950 | 35.2 | G1 |
| 2 | 59.886 | 7.33 | 1.48749 | 70.2 | |
| 3 | −531.005 | 0.17 | | | |
| 4 | 72.905 | 6.90 | 1.48749 | 70.2 | |
| 5 | −311.442 | (variable) | | | |
| 6 | −199.936 | 1.99 | 1.75692 | 31.7 | G2 |
| 7 | −80.887 | 0.78 | 1.80218 | 44.7 | |
| 8 | 38.410 | 4.92 | | | |
| 9 | −29.996 | 0.78 | 1.58913 | 61.2 | |
| 10 | 60.669 | 3.45 | 1.90837 | 23.2 | |
| 11 | −194.902 | (variable) | | | |
| 12 | 133.654 | 3.28 | 1.53172 | 49.1 | G3 |
| 13 | −90.720 | 0.17 | | | |
| 14 | 75.016 | 5.87 | 1.46450 | 65.8 | |
| 15 | −39.498 | 1.29 | 1.79504 | 28.6 | |
| 16 | −141.145 | (variable) | | | |
| 17 | 47.598 | 4.31 | 1.61720 | 54.0 | G4 |
| 18 | −211.249 | 3.37 | | | |
| 19 | −322.764 | 2.76 | 1.46450 | 65.8 | |
| 20 | −61.686 | 1.21 | | | |
| 21 | −61.922 | 1.38 | 1.80518 | 25.4 | |
| 22 | −212.617 | 39.86 | | | |
| 23 | −19.636 | 1.99 | 1.71300 | 54.0 | |
| 24 | −35.614 | 0.09 | | | |
| 25 | 134.054 | 2.42 | 1.64831 | 33.8 | |
| 26 | −178.821 | | | | |

$f_{10} = 106.0 \quad f_{20} = -28.0 \quad f_{30} = 74.9 \quad f_{40} = 94.9$
$f_{11} = 773.1 \quad f_1 = -129.4 \quad f_2 = 110.8 \quad f_3 = 121.9$ Stop is 4.31 behind $r_{22}$

| f | 60.4 | 112.6 | 209.7 |
|---|---|---|---|
| d5 | 1.20 | 25.11 | 43.21 |
| d11 | 25.03 | 14.44 | 0.75 |
| d16 | 3.01 | 1.64 | 6.28 |
| Bf | 35.35 | 47.30 | 56.36 |
| F No | 3.5 | 4.1 | 4.6 |

$(r_{11} + r_9)/(r_{11} - r_9) = 1.364$
$f_{21}/f_{22} = 0.374$

EXAMPLE 2 f = 60.4~209.7  
F-number: 3.5~4.6     k = 0.5

| No. | curvature radius r | center thickness air space between lenses d | refractive index n | Abbe's number ν | |
|---|---|---|---|---|---|
| 1 | 158.169 | 1.47 | 1.74950 | 35.2 | G₁ |
| 2 | 59.886 | 7.33 | 1.48749 | 70.2 | |
| 3 | −531.004 | 0.17 | | | |
| 4 | 73.017 | 6.90 | 1.48749 | 70.2 | |
| 5 | −309.350 | (variable) | | | |
| 6 | −207.292 | 1.99 | 1.69895 | 30.1 | G₂ |
| 7 | −77.138 | 0.78 | 1.78797 | 47.5 | |
| 8 | 37.730 | 5.18 | | | |
| 9 | −29.051 | 0.78 | 1.51680 | 64.1 | |
| 10 | 59.175 | 3.54 | 1.90837 | 23.2 | |
| 11 | −480.760 | (variable) | | | |
| 12 | 115.190 | 3.28 | 1.53172 | 49.1 | G₃ |
| 13 | −90.119 | 0.17 | | | |
| 14 | 80.274 | 5.87 | 1.46450 | 65.8 | |
| 15 | −38.665 | 1.29 | 1.79504 | 28.6 | |
| 16 | −143.882 | (variable) | | | |
| 17 | 46.938 | 4.49 | 1.56883 | 56.0 | G₄ |
| 18 | −157.775 | 3.37 | | | |
| 19 | −260.723 | 2.50 | 1.46450 | 65.8 | |
| 20 | −65.925 | 1.21 | | | |
| 21 | −62.876 | 1.38 | 1.80518 | 25.4 | |
| 22 | −169.462 | 39.864 | | | |
| 23 | −19.804 | 1.99 | 1.71300 | 54.0 | |
| 24 | −35.740 | 0.09 | | | |
| 25 | 134.054 | 2.42 | 1.64831 | 33.8 | |
| 26 | −196.037 | | | | |

$f_{10} = 106.0$  $f_{20} = -28.0$  $f_{30} = 74.9$  $f_{40} = 94.9$  
$f_{11} = 773.1$  $f_1 = -129.4$  $f_2 = 110.8$  $f_3 = 121.9$  
Stop is 4.31 behind r₂₂

| f | 60.4 | 112.6 | 209.7 |
|---|---|---|---|
| d5 | 1.19 | 25.03 | 43.09 |
| d11 | 25.19 | 14.57 | 0.83 |
| d16 | 2.70 | 1.40 | 6.12 |
| Bf | 35.53 | 47.45 | 56.48 |
| F No | 3.5 | 4.1 | 4.6 |

$(r_{11} + r_9)/(r_{11} - r_9) = 1.129$  
$f_{21}/f_{22} = 0.358$

EXAMPLE 3 f = 70.0~243.0  
F-number: 3.5~4.6     k = 0.5

| No. | curvature radius r | center thickness air space between lenses d | refractive index n | Abbe's number ν | |
|---|---|---|---|---|---|
| 1 | 183.309 | 1.70 | 1.74950 | 35.2 | G₁ |
| 2 | 69.405 | 8.50 | 1.48749 | 70.2 | |
| 3 | −615.405 | 0.20 | | | |
| 4 | 84.493 | 8.00 | 1.48749 | 70.2 | |
| 5 | −360.944 | (variable) | | | |
| 6 | −224.070 | 2.30 | 1.69895 | 30.1 | G₂ |
| 7 | −93.744 | 0.90 | 1.79668 | 45.5 | |
| 8 | 45.515 | 5.70 | | | |
| 9 | −35.788 | 0.90 | 1.58913 | 61.2 | |
| 10 | 68.881 | 4.00 | 1.90837 | 23.2 | |
| 11 | −266.591 | (variable) | | | |
| 12 | 154.897 | 3.80 | 1.53172 | 49.1 | G₃ |
| 13 | −105.139 | 0.20 | | | |
| 14 | 86.939 | 6.80 | 1.46450 | 65.8 | |
| 15 | −45.776 | 1.50 | 1.79504 | 28.6 | |
| 16 | −163.579 | (variable) | | | |
| 17 | 55.261 | 5.00 | 1.61720 | 50.0 | G₄ |
| 18 | −244.826 | 3.90 | | | |
| 19 | −374.065 | 3.20 | 1.46450 | 65.8 | |
| 20 | −71.491 | 1.40 | | | |
| 21 | −72.063 | 1.60 | 1.80518 | 25.4 | |
| 22 | −250.476 | 46.20 | | | |
| 23 | −22.757 | 2.30 | 1.71300 | 54.0 | |
| 24 | −41.275 | 0.10 | | | |
| 25 | 155.361 | 2.80 | 1.64831 | 33.8 | |
| 26 | −200.597 | | | | |

$f_{10} = 122.8$  $f_{20} = -32.4$  $f_{30} = 86.8$  $f_{40} = 110.0$  
$f_{11} = 895.9$  $f_1 = -150.0$  $f_2 = 128.5$  $f_3 = 141.3$  
Stop is 5.0 behind r₂₂

| f | 70.0 | 130.5 | 243.0 |
|---|---|---|---|
| d5 | 1.29 | 28.99 | 49.98 |
| d11 | 29.09 | 16.82 | 0.95 |
| d16 | 2.76 | 1.17 | 6.55 |
| Bf | 41.14 | 54.99 | 65.48 |
| F No | 3.5 | 4.1 | 4.6 |

$(r_{11} + r_9)/(r_{11} - r_9) = 1.310$  
$f_{21}/f_{22} = 0.379$

EXAMPLE 4 f = 70.0~243.0  
F-number: 3.5~5.2     k = 0.8

| No. | curvature radius r | center thickness air space between lenses d | refractive index n | Abbe's number ν | |
|---|---|---|---|---|---|
| 1 | 183.309 | 1.70 | 1.74950 | 35.2 | G₁ |
| 2 | 69.405 | 8.50 | 1.48749 | 70.2 | |
| 3 | −615.405 | 0.20 | | | |
| 4 | 85.493 | 8.00 | 1.48749 | 70.2 | |
| 5 | −343.267 | (variable) | | | |
| 6 | −226.836 | 2.33 | 1.68893 | 31.1 | G₂ |
| 7 | −94.901 | 0.91 | 1.80218 | 44.7 | |
| 8 | 46.719 | 5.77 | | | |
| 9 | −36.260 | 0.91 | 1.58913 | 61.2 | |
| 10 | 69.934 | 4.05 | 1.90837 | 23.2 | |
| 11 | −269.870 | (variable) | | | |
| 12 | 154.897 | 3.80 | 1.53172 | 49.1 | G₃ |
| 13 | −89.928 | 0.20 | | | |
| 14 | 119.596 | 6.80 | 1.46450 | 65.8 | |
| 15 | −45.776 | 1.50 | 1.79504 | 28.6 | |
| 16 | −144.281 | (variable) | | | |
| 17 | 54.151 | 5.00 | 1.61720 | 54.0 | G₄ |
| 18 | −234.657 | 3.90 | | | |
| 19 | −374.065 | 3.20 | 1.46450 | 65.8 | |
| 20 | −71.582 | 1.40 | | | |
| 21 | −70.524 | 1.60 | 1.80518 | 25.4 | |
| 22 | −251.710 | 46.20 | | | |
| 23 | −23.530 | 2.30 | 1.71300 | 54.0 | |
| 24 | −41.275 | 0.10 | | | |
| 25 | 824.875 | 2.80 | 1.68893 | 31.1 | |
| 26 | −134.245 | | | | |

$f_{10} = 122.8$  $f_{20} = -32.8$  $f_{30} = 86.8$  $f_{40} = 110.0$  
$f_{11} = 895.9$  $f_1 = -150.0$  $f_2 = 128.5$  $f_3 = 141.3$  
Stop is 0.5 behind r₂₂

| f | 70.0 | 130.5 | 243.0 |
|---|---|---|---|
| d5 | 1.40 | 25.16 | 45.22 |
| d11 | 28.34 | 15.40 | 1.16 |
| d16 | 13.95 | 7.88 | 6.07 |
| Bf | 39.31 | 58.31 | 74.36 |
| F No | 3.6 | 4.5 | 5.2 |

$(r_{11} + r_9)/(r_{11} - r_9) = 1.310$  
$f_{21}/f_{22} = 0.379$

EXAMPLE 5 f = 70.0~243.0  
F-number: 3.7~4.6     k = 0.4

| No. | curvature radius r | center thickness air space between lenses d | refractive index n | Abbe's number ν | |
|---|---|---|---|---|---|
| 1 | 183.309 | 1.70 | 1.74950 | 35.2 | G₁ |
| 2 | 69.405 | 8.50 | 1.48749 | 70.2 | |
| 3 | −615.405 | 0.20 | | | |

-continued

| | | | | | |
|---|---|---|---|---|---|
| 4 | 84.893 | 8.00 | 1.48749 | 70.2 | |
| 5 | −353.607 | (variable) | | | |
| 6 | −224.234 | 2.30 | 1.69895 | 30.1 | G$_2$ |
| 7 | −89.087 | 0.89 | 1.79668 | 45.5 | |
| 8 | 44.830 | 5.63 | | | |
| 9 | −35.025 | 0.89 | 1.58913 | 61.2 | |
| 10 | 68.031 | 3.95 | 1.90837 | 23.2 | |
| 11 | −250.284 | (variable) | | | |
| 12 | 154.897 | 3.80 | 1.53172 | 49.1 | G$_3$ |
| 13 | −107.761 | 0.20 | | | |
| 14 | 78.754 | 6.80 | 1.46450 | 65.8 | |
| 15 | −45.776 | 1.50 | 1.79504 | 28.6 | |
| 16 | −181.056 | (variable) | | | |
| 17 | 55.616 | 5.00 | 1.61720 | 54.0 | G$_4$ |
| 18 | −240.894 | 3.90 | | | |
| 19 | −374.065 | 3.20 | 1.46450 | 65.8 | |
| 20 | −71.466 | 1.40 | | | |
| 21 | −71.924 | 1.60 | 1.80518 | 25.4 | |
| 22 | −241.850 | 46.20 | | | |
| 23 | −22.284 | 2.30 | 1.69680 | 55.6 | |
| 24 | −44.812 | 0.10 | | | |
| 25 | 155.361 | 2.80 | 1.65128 | 38.2 | |
| 26 | −136.911 | | | | |

$f_{10} = 122.8$  $f_{20} = -32.0$  $f_{30} = 86.8$  $f_{40} = 110.0$
$f_{11} = 895.9$  $f_1 = -150.0$  $f_2 = 128.5$  $f_3 = 141.3$

Stop is 0.5 behind $r_{22}$

| f | 70.0 | 130.5 | 243.0 |
|---|---|---|---|
| d5 | 1.39 | 30.86 | 52.09 |
| d11 | 29.67 | 17.83 | 1.52 |
| d16 | 0.74 | 0.79 | 8.61 |
| Bf | 42.01 | 53.80 | 62.29 |
| F No | 3.7 | 4.2 | 4.6 |

$(r_{11} + r_9)/(r_{11} - r_9) = 1.325$
$f_{21}/f_{22} = 0.377$

Figure 3A:
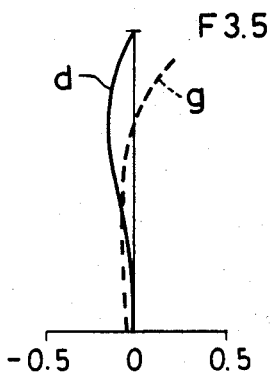
FIGS. 3A, 3B and 3C are aberration diagrams of the first embodiment.
Figure 3A:
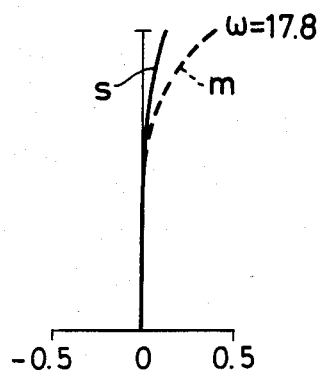
Figure 3A:
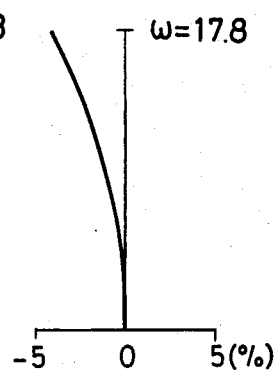
Figure 3A:
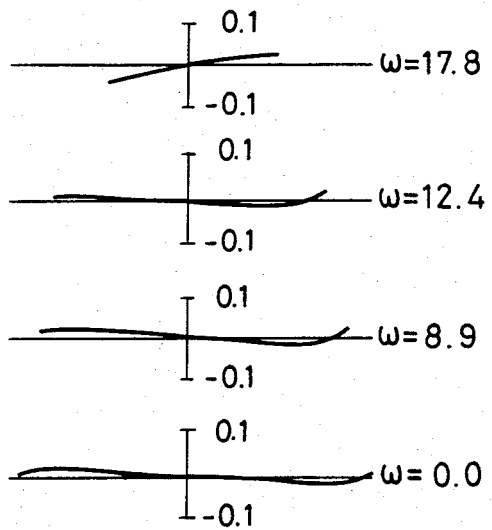
Figure 3B:
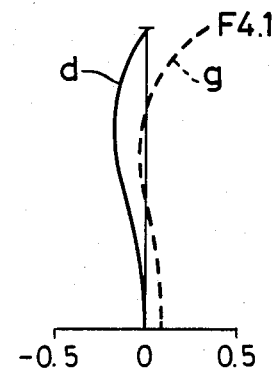
Figure 3B:
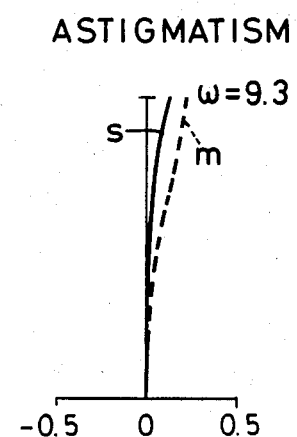
Figure 3B:
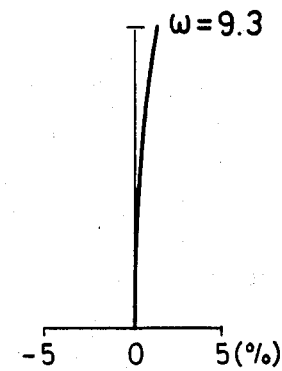
Figure 3B:
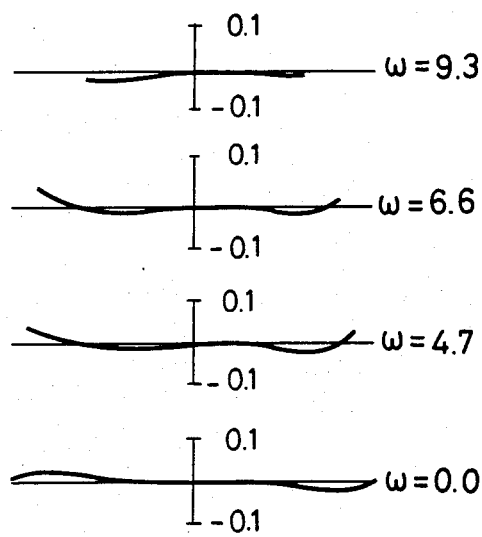
Figure 3C:
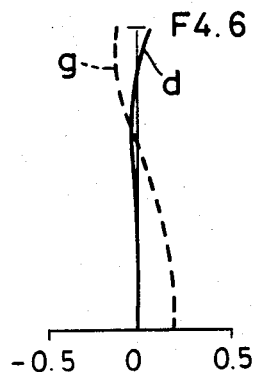
Figure 3C:
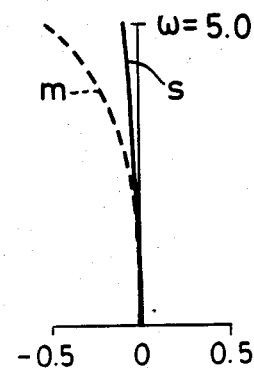
Figure 3C:
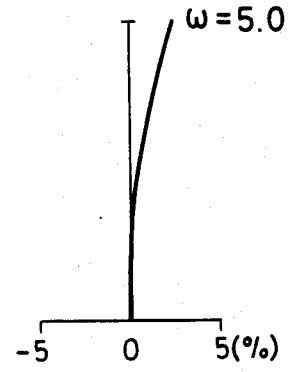
Figure 3C:
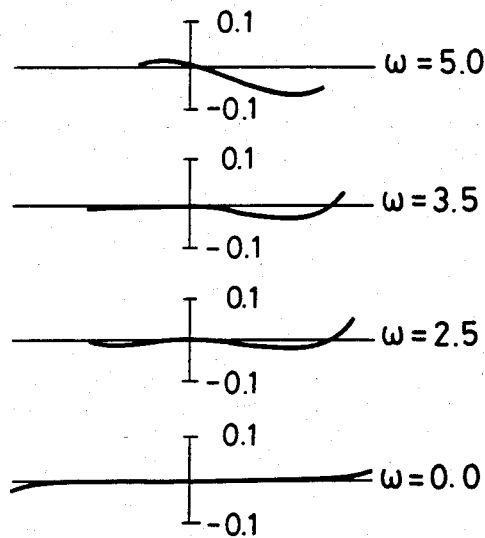
Figure 4A:
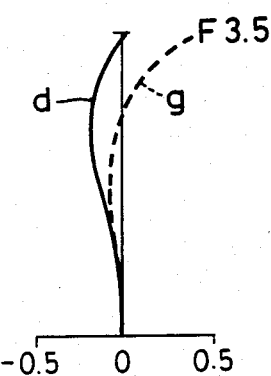
FIGS. 4A, 4B and 4C are aberration diagrams of the second embodiment.
Figure 4A:
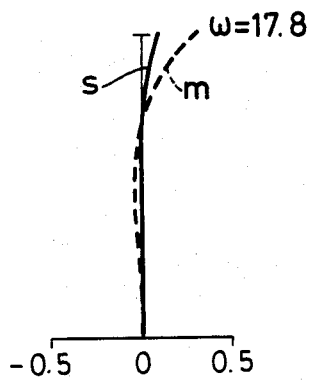
Figure 4A:
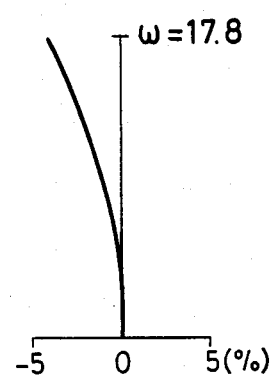
Figure 4A:
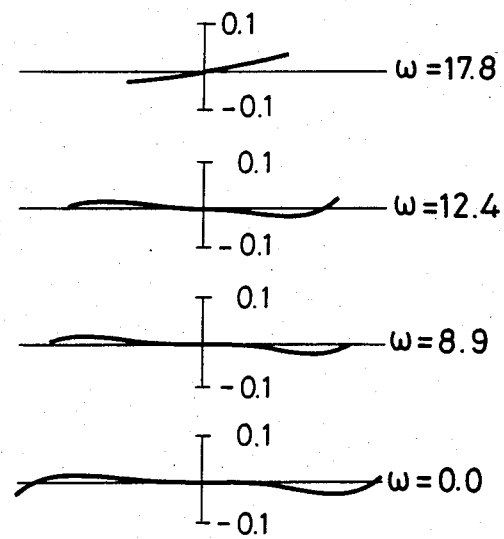
Figure 4B:
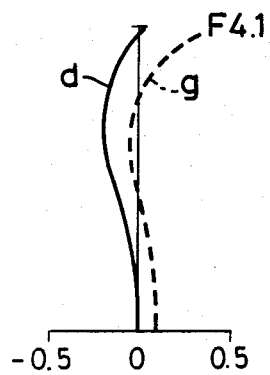
Figure 4B:
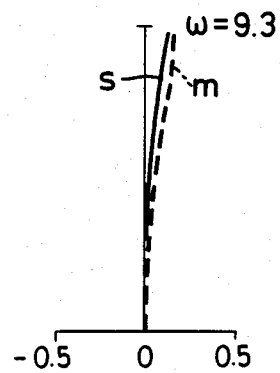
Figure 4B:
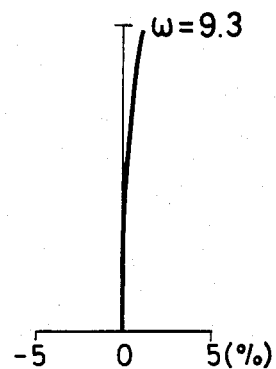
Figure 4B:
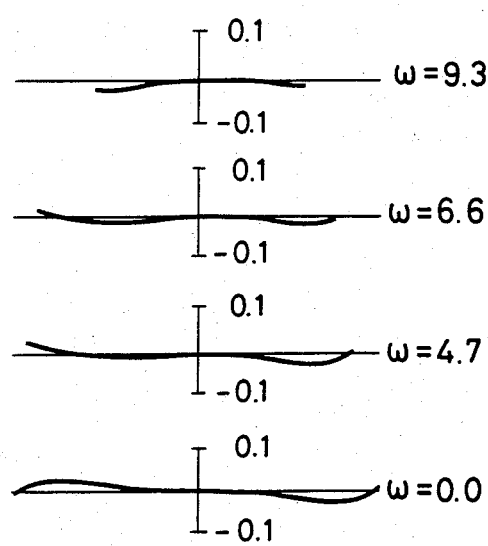
Figure 4C:
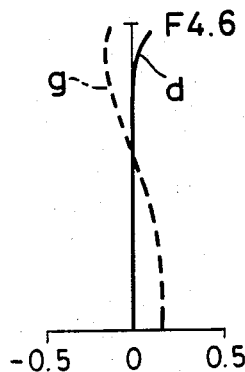
Figure 4C:
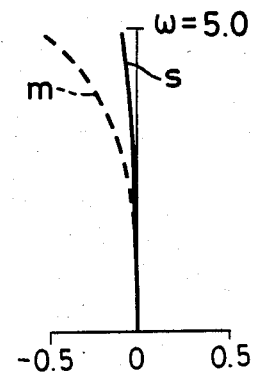
Figure 4C:
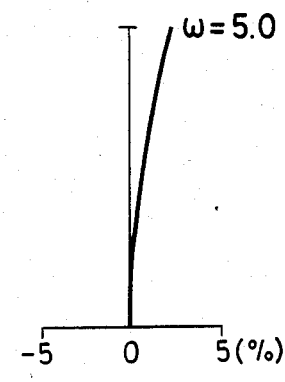
Figure 4C:
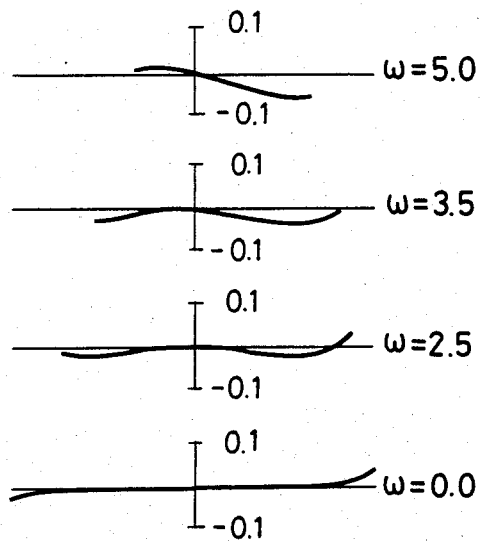
Figure 5A:
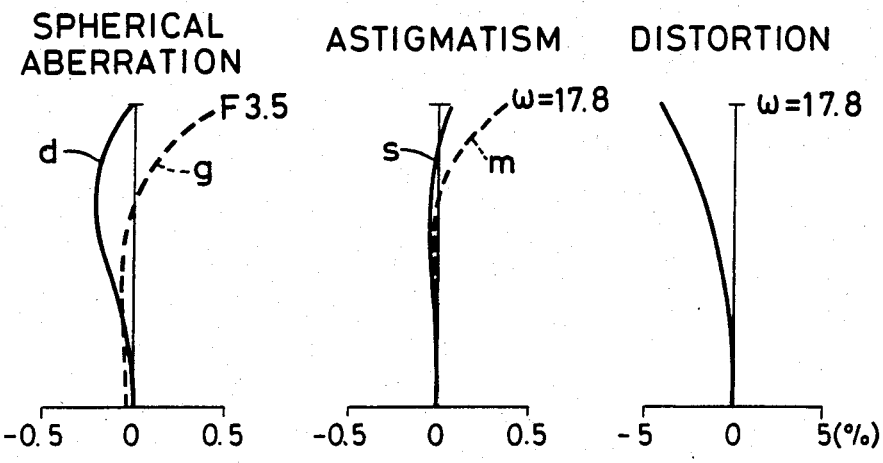
FIGS. 5A, 5B and 5C are aberration diagrams of the third embodiments.
Figure 5A:
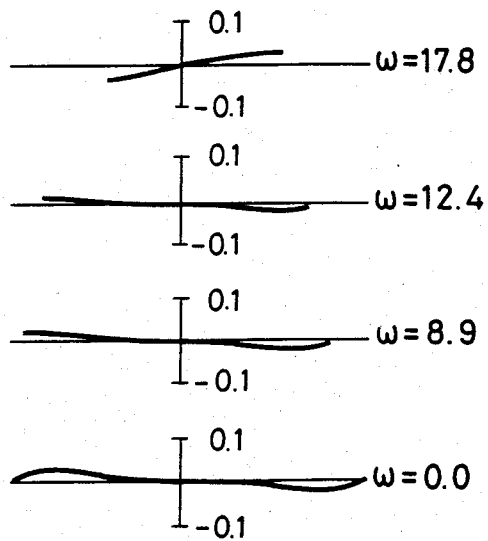
Figure 5B:
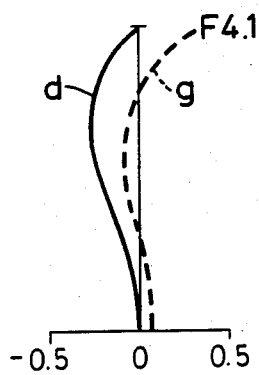
Figure 5B:
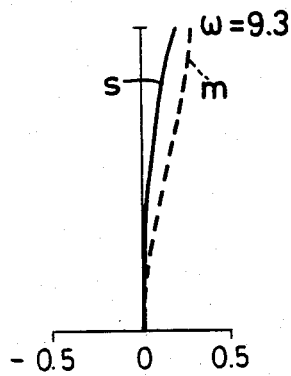
Figure 5B:
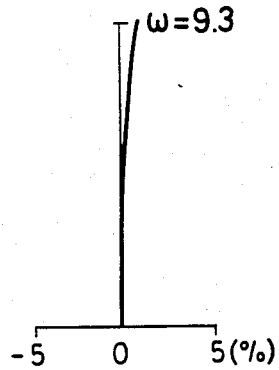
Figure 5B:
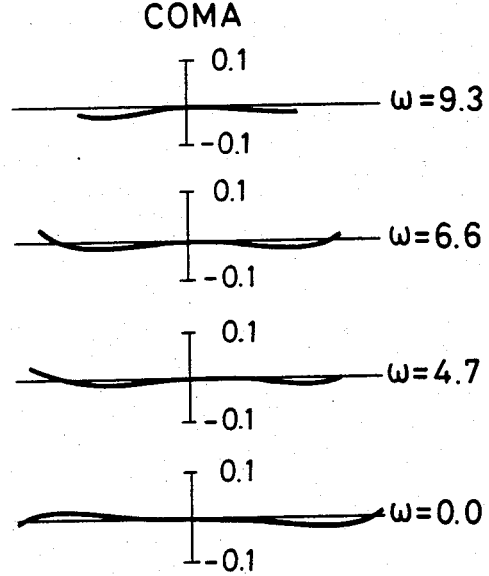
Figure 5C:
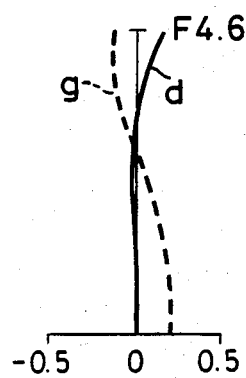
Figure 5C:
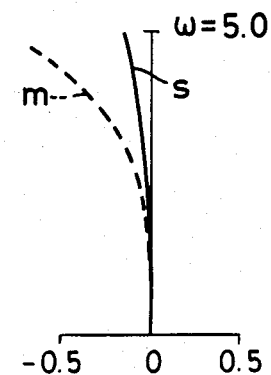
Figure 5C:
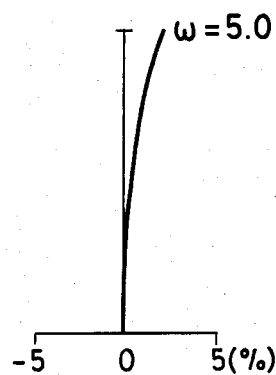
Figure 5C:
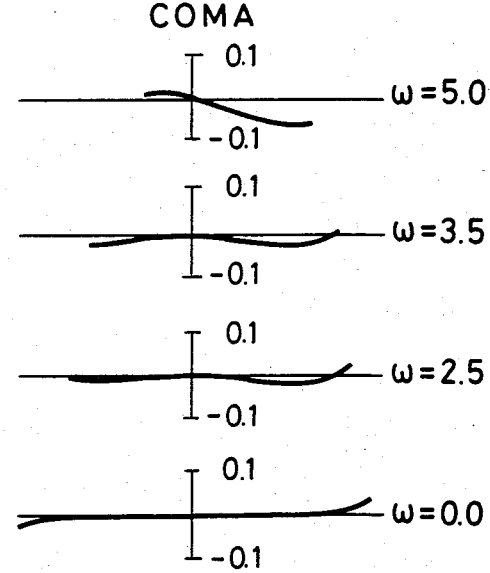
Figure 6A:
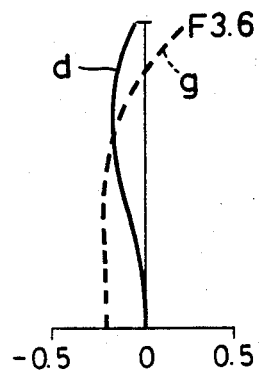
FIGS. 6A, 6B and 6C are aberration diagrams of the fourth embodiment.
Figure 6A:
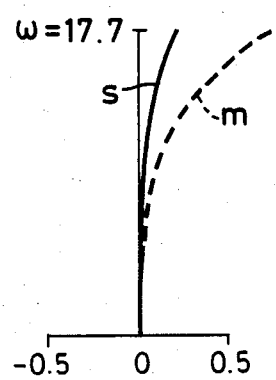
Figure 6A:
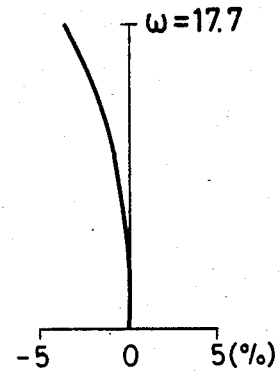
Figure 6A:
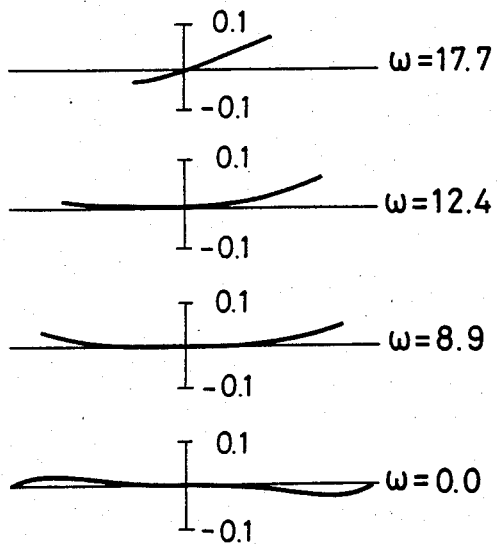
Figure 6B:
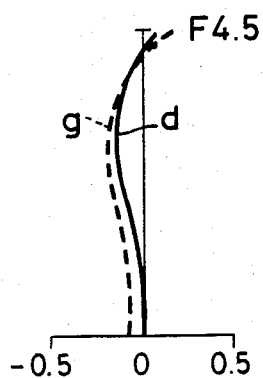
Figure 6B:
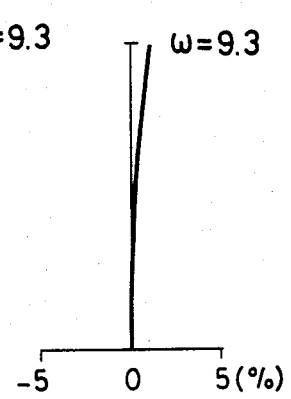
Figure 6B:
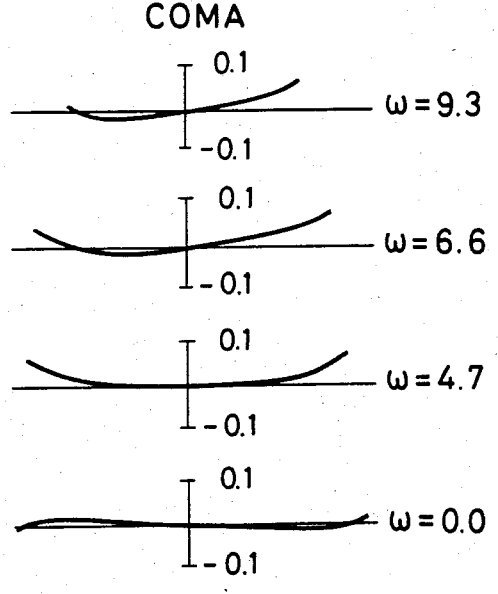
Figure 6C:
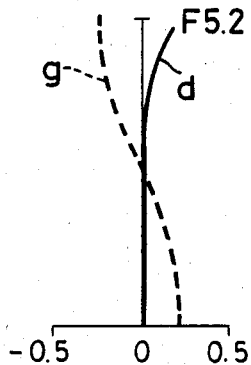
Figure 6C:
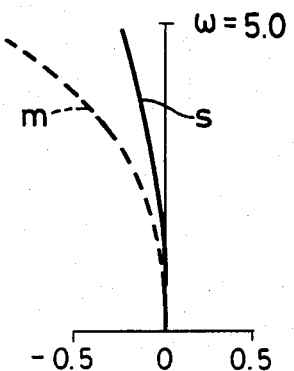
Figure 6C:
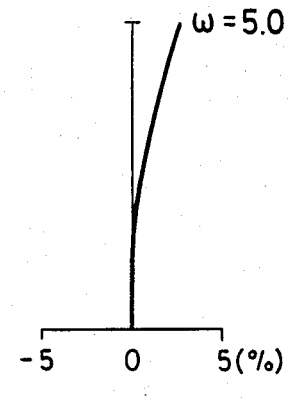
Figure 6C:
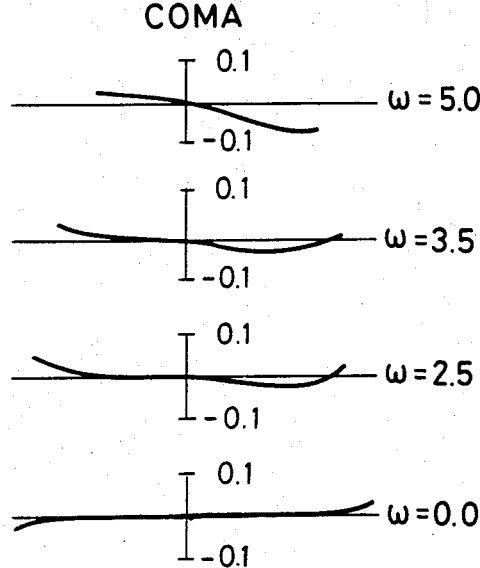
Figure 7A:
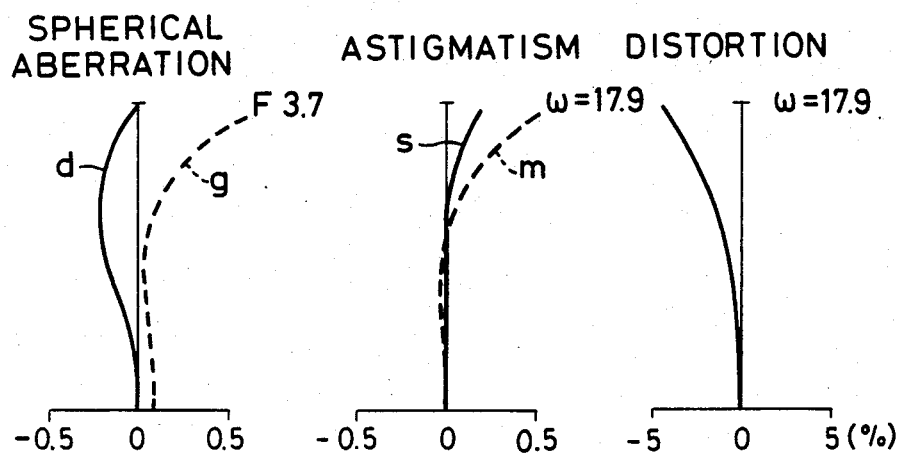
FIGS. 7A, 7B and 7C are aberration diagrams of the fifth embodiment.
Figure 7A:
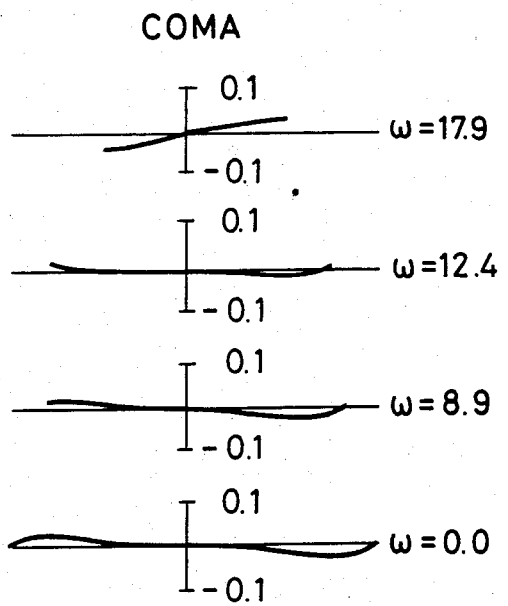
Figure 7B:
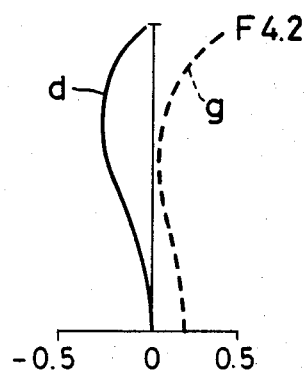
Figure 7B:
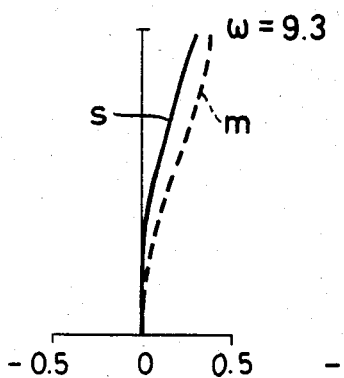
Figure 7B:
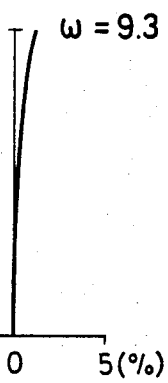
Figure 7B:
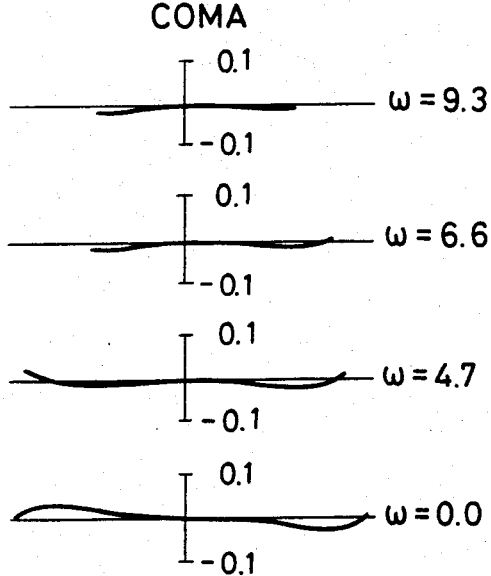
Figure 7C:
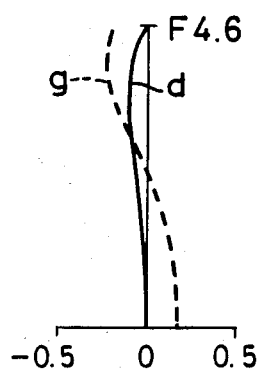
Figure 7C:
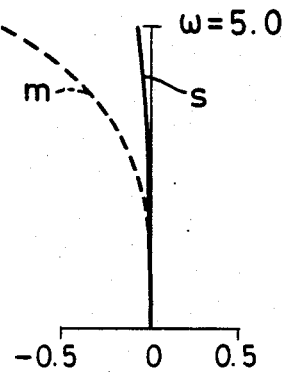
Figure 7C:
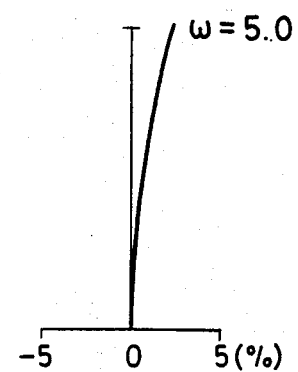
Figure 7C:
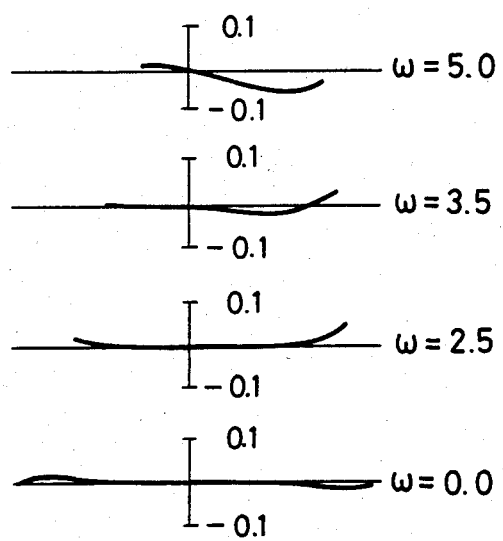

FIGS. 3A, 3B and 3C show the aberrations of the zoom lens of Example 1 at the wide angle end position, at the middle position and at the telephoto end position, respectively. Similarly, FIGS. 4A to 4C, FIGS. 5A to 5C, FIGS. 6A to 6C and FIGS. 7A to 7C show the aberrations of the zoom lenses of the above Examples 2, 3, 4 and 5.

As previously described, k is $x_4/x_1$ i.e. the ratio of the displacement of the fourth lens group G4 to the displacement of the first lens group G1 for any focal length position from the wide angle end as the base. As shown in the above tables, the value of k was 0.5 in the embodiments of Examples 1, 2 and 3.

In the case of Example 4, the value k was 0.8. In the zoom lens of Example 5, the value k was 0.4 which was the smallest of all. It means that the amount of movement of the fourth lens group G4 relative to that of the first lens group G1 is the smallest in the zoom lens of Example 5 and, therefore, the smallest variation of F-number with magnification change is attained by the embodiment of Example 5.

Figure 8A:
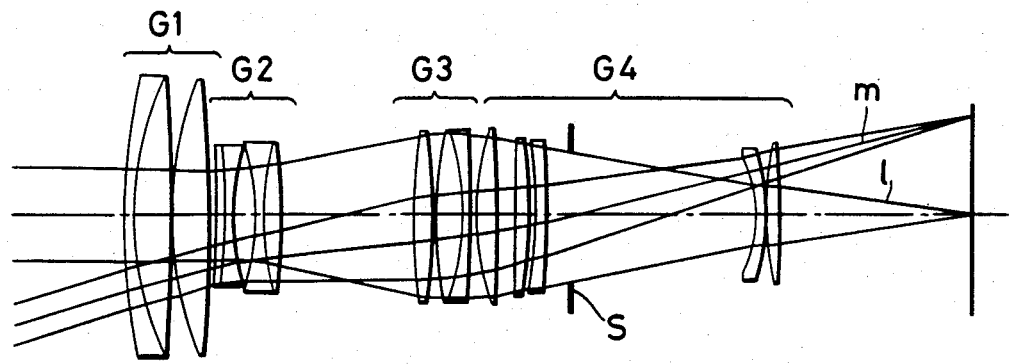
FIGS. 8A and 8B are optical path diagrams of the fifth embodiment.
Figure 8B:
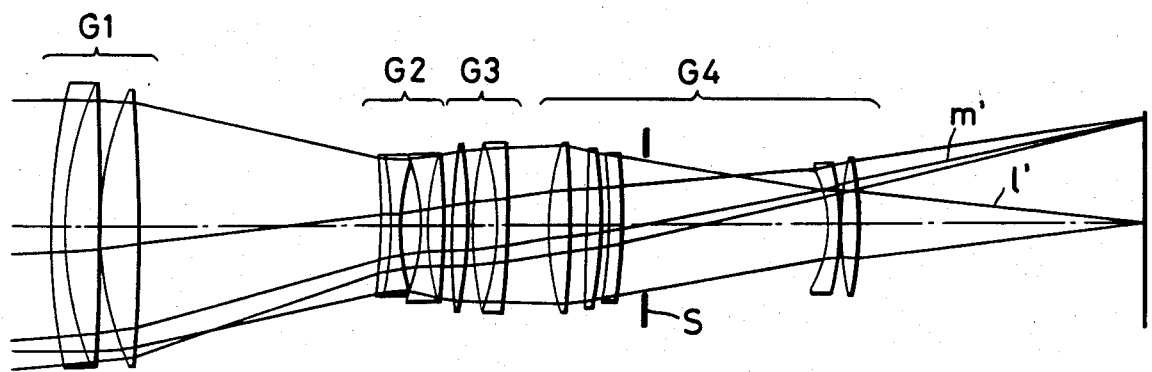

FIG. 8A is an optical path diagram at the wide angle end of the zoom lens of Example 5 and FIG. 8B is that at the telephoto end of the same. In these figures, 1 designates a marginal ray from an object point on axis at infinity and m designates a principal ray having the maximum view angle. As seen from the figures, the exit angle of the marginal ray 1 from the lens system remains almost unchanged between the wide angle end position and the telephoto end position. As to the principal ray m also, there is little difference in exit angle between the two end positions. From the fact that the exit angle of the marginal ray 1 does not change so much, it is obvious that there is a little variation of F-number with magnification change. Also, the little change in exit angle of the principal ray m having the maximum view angle demonstrates that this embodiment is particularly advantageous for correcting the variation of off-axial aberrations.

Figure 9:
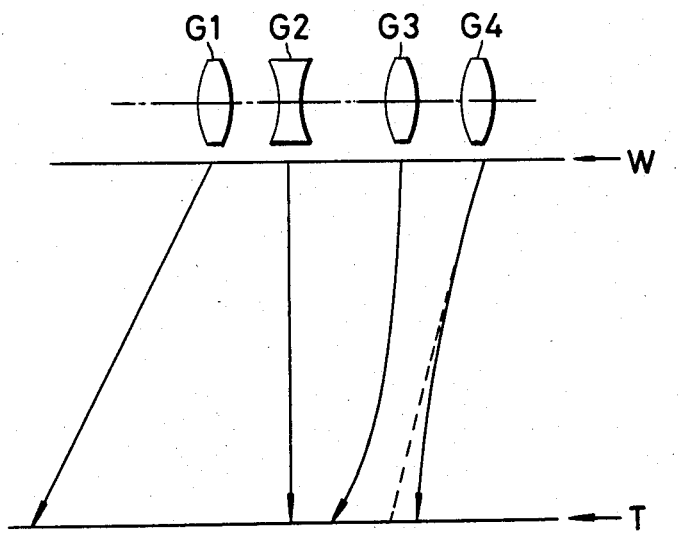
FIG. 9 shows the loci of movements of the lens groups in the sixth to ninth embodiment of the invention.
Figure 10A:
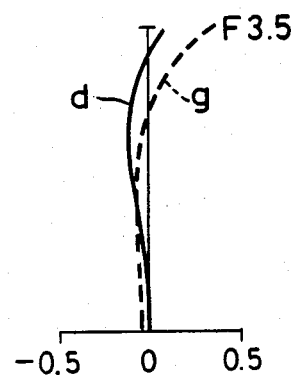
FIGS. 10A, 10B and 10C are aberration diagrams of the sixth embodiment.
Figure 10A:
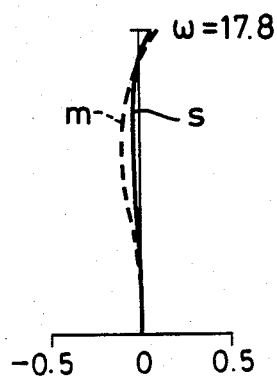
Figure 10A:
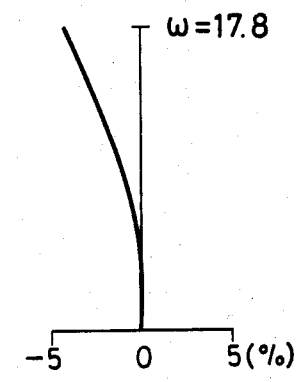
Figure 10A:
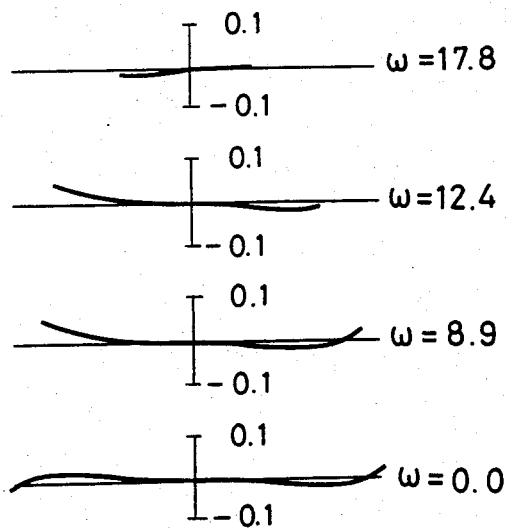
Figure 10B:
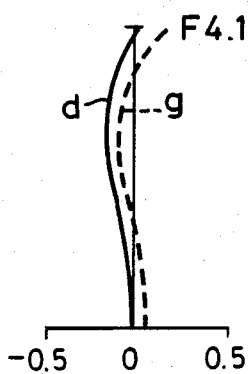
Figure 10B:
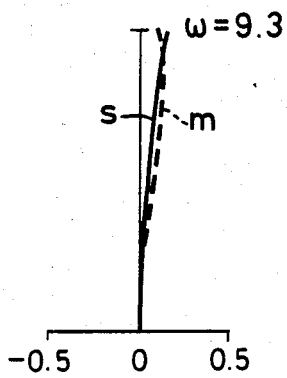
Figure 10B:
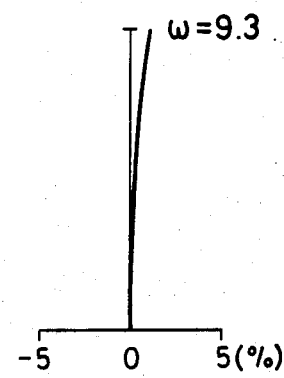
Figure 10B:
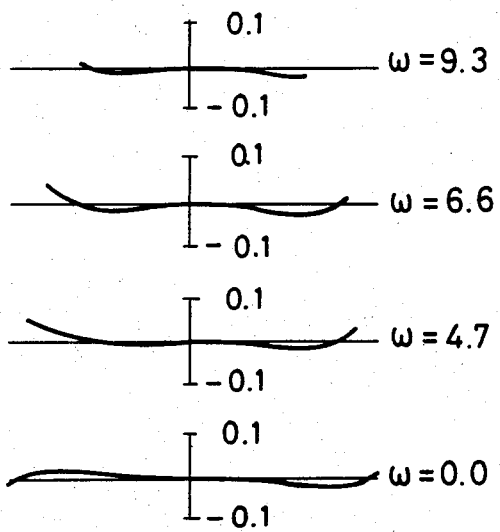
Figure 10C:
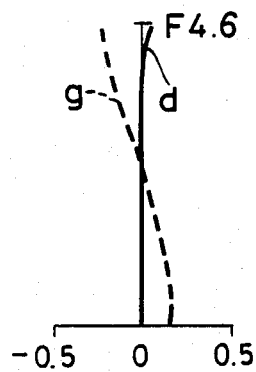
Figure 10C:
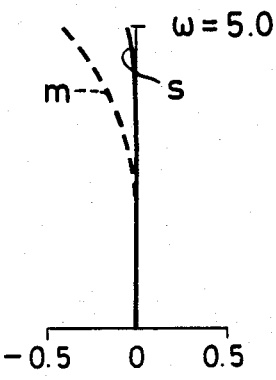
Figure 10C:
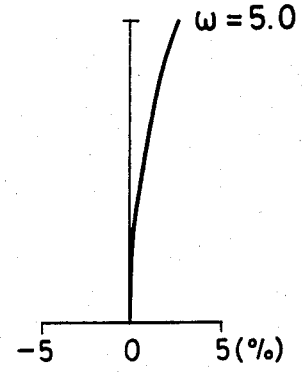
Figure 10C:
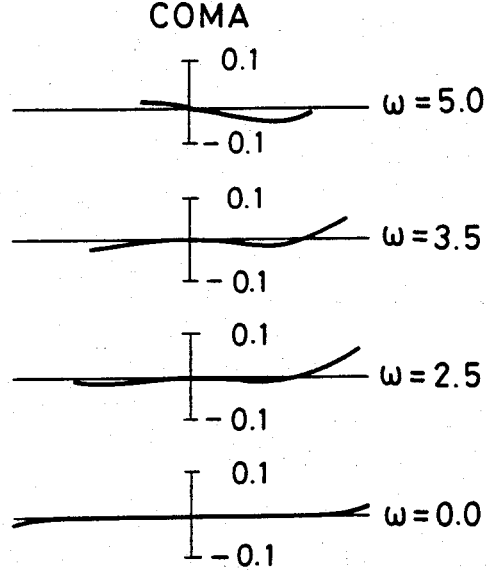
Figure 11A:
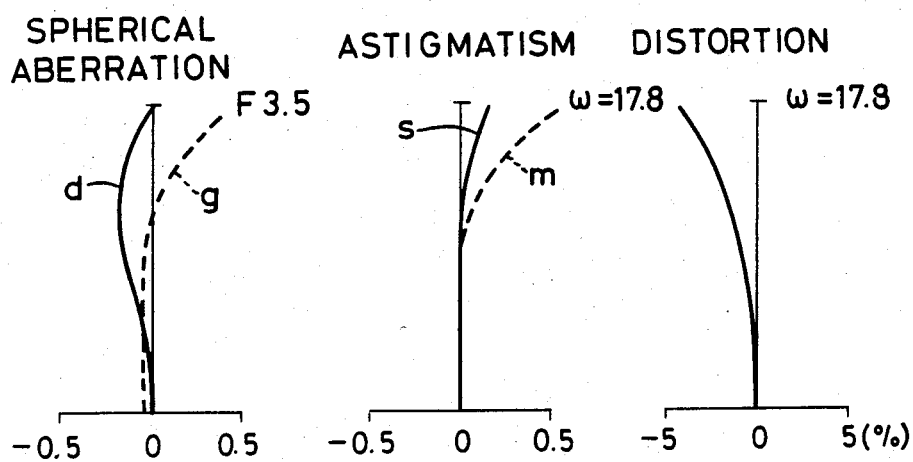
FIGS. 11A, 11B and 11C are aberration diagrams of the seventh embodiment.
Figure 11A:
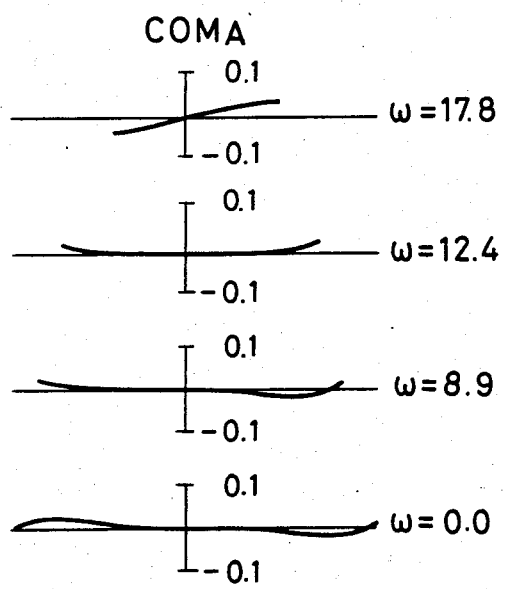
Figure 11B:
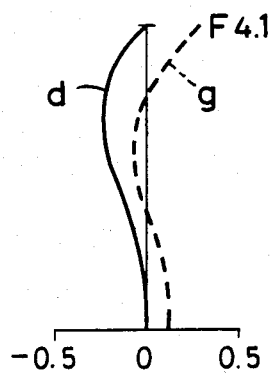
Figure 11B:
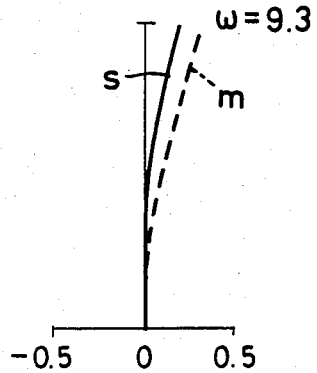
Figure 11B:
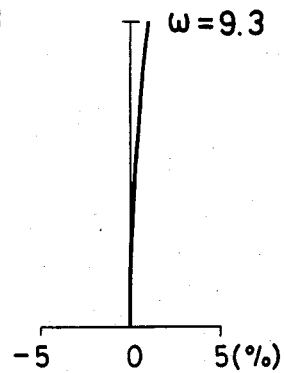
Figure 11B:
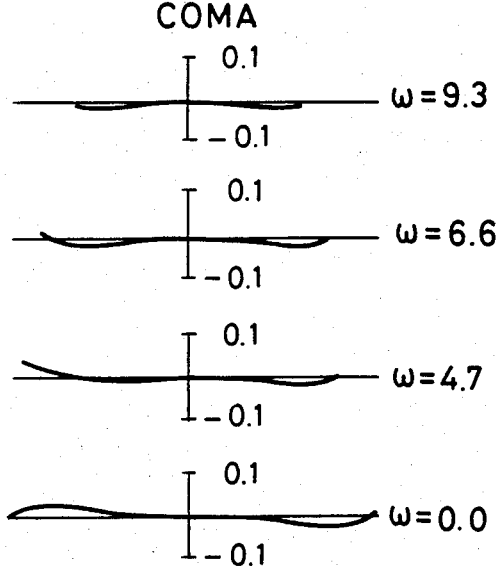
Figure 11C:
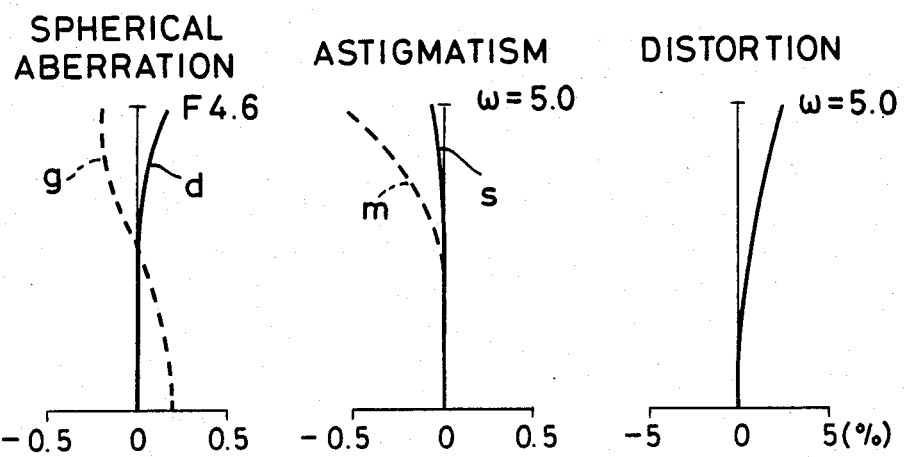
Figure 11C:
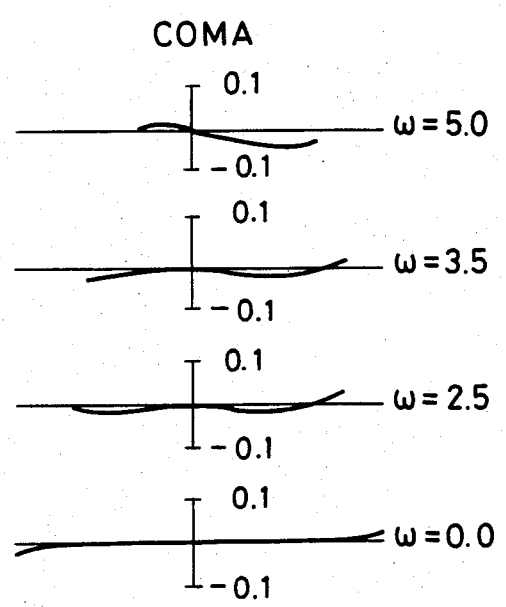

FIG. 9 shows another basic form of the zoom lens according to the invention in which not only the third lens group G3 but also the fourth lens group G4 are moved in a non-linar fashion for magnification change. In other respects, this form is substantially the same as that of the above-shown embodiments. As seen in FIG. 9, the fourth lens group G4 in this embodiment is moved in such manner that its movement toward the object is slowed down on the telephoto side and it describes a non-linear locus convex toward the object side.

This form of the zoom lens allows more advantageous correction of the variations of aberrations, especially astigmatism caused by magnification change. Hereinafter preferred embodiments of the invention based upon this basic form will be shown as Examples 6, 7, 8 and 9. Aberrations of the zoom lenses of these Examples 6, 7, 8 and 9 are shown in FIGS. 10A to 10C, 11A to 11C, 13A to 13C and 14A to 14C respectively.

EXAMPLE 6

$f = 60.4 \sim 209.7$
F-number: $3.5 \sim 4.6$   $k = 0.46 \sim 0.5$

| No. | curvature radius r | center thickness air space between lenses d | refractive index n | Abbe's number ν | |
|---|---|---|---|---|---|
| 1 | 153.568 | 1.47 | 1.80368 | 33.8 | G$_1$ |
| 2 | 57.615 | 7.33 | 1.51680 | 64.1 | |
| 3 | −1413.023 | 0.17 | | | |
| 4 | 72.986 | 6.39 | 1.51680 | 64.1 | |
| 5 | −280.307 | (variable) | | | |
| 6 | −399.928 | 1.99 | 1.59507 | 35.5 | G$_2$ |
| 7 | −71.893 | 0.78 | 1.80411 | 46.4 | |
| 8 | 42.140 | 4.66 | | | |
| 9 | −32.681 | 0.78 | 1.58913 | 61.2 | |
| 10 | 53.953 | 3.62 | 1.86074 | 23.0 | |
| 11 | −372.244 | (variable) | | | |
| 12 | 132.871 | 3.37 | 1.67025 | 57.6 | G$_3$ |
| 13 | −121.027 | 0.86 | | | |
| 14 | 87.297 | 5.78 | 1.51860 | 70.1 | |
| 15 | −42.627 | 0.78 | 1.80368 | 33.8 | |
| 16 | −238.453 | (variable) | | | |
| 17 | 49.071 | 4.06 | 1.69680 | 55.6 | G$_4$ |
| 18 | −455.672 | 3.37 | | | |
| 19 | −355.293 | 3.02 | 1.51860 | 70.1 | |
| 20 | −64.065 | 1.21 | | | |
| 21 | −63.266 | 1.38 | 1.78470 | 26.1 | |
| 22 | −287.768 | 39.86 | | | |
| 23 | −19.694 | 1.99 | 1.71300 | 54.0 | |
| 24 | −38.656 | 0.09 | | | |
| 25 | 154.955 | 2.42 | 1.64831 | 33.8 | |
| 26 | −110.666 | | | | |

$f_{10} = 105.8$  $f_{20} = -28.5$  $f_{30} = 75.2$  $f_{40} = 94.9$
$f_{11} = 1565.0$  $f_1 = -115.5$  $f_2 = 107.3$  $f_3 = 112.7$

Stop is 4.31 behind $r_{22}$

| f | 60.4 | 112.6 | 209.7 |
|---|---|---|---|
| d5 | 1.23 | 24.85 | 43.42 |
| d11 | 25.80 | 14.78 | 0.20 |
| d16 | 1.42 | 0.62 | 7.61 |
| Bf | 34.25 | 46.07 | 53.66 |
| F No | 3.5 | 4.1 | 4.6 |

$(r_{11} + R_9)/(r_{11} - r_9) = 1.192$
$f_{21}/f_{22} = 0.448$

EXAMPLE 7

$f = 70.0 \sim 243.0$
F-number: $3.5 \sim 4.6$   $k = 0.47 \sim 0.55$
center thickness
air space -continued

| No. | curvature radius r | between lenses d | refractive index n | Abbe's number ν | |
|---|---|---|---|---|---|
| 1 | 183.369 | 1.70 | 1.74950 | 35.2 | $G_1$ |
| 2 | 69.470 | 8.50 | 1.48749 | 70.2 | |
| 3 | −616.150 | 0.20 | | | |
| 4 | 84.464 | 8.00 | 1.48749 | 70.2 | |
| 5 | −361.706 | (variable) | | | |
| 6 | −223.202 | 2.30 | 1.69895 | 30.1 | $G_2$ |
| 7 | −93.948 | 0.90 | 1.79668 | 45.5 | |
| 8 | 45.471 | 5.70 | | | |
| 9 | −35.786 | 0.90 | 1.58913 | 61.2 | |
| 10 | 68.805 | 4.00 | 1.90837 | 23.2 | |
| 11 | −265.274 | (variable) | | | |
| 12 | 154.694 | 3.80 | 1.53172 | 49.1 | $G_3$ |
| 13 | −105.111 | 0.20 | | | |
| 14 | 87.068 | 6.80 | 1.46450 | 65.8 | |
| 15 | −45.767 | 1.50 | 1.79504 | 28.6 | |
| 16 | −163.454 | (variable) | | | |
| 17 | 55.180 | 5.00 | 1.61720 | 54.0 | $G_4$ |
| 18 | −246.345 | 3.90 | | | |
| 19 | −374.490 | 3.20 | 1.46450 | 65.8 | |
| 20 | −71.514 | 1.40 | | | |
| 21 | −72.192 | 1.60 | 1.80518 | 25.4 | |
| 22 | −252.637 | 46.20 | | | |
| 23 | −22.726 | 2.30 | 1.71300 | 54.0 | |
| 24 | −41.204 | 0.10 | | | |
| 25 | 155.945 | 2.80 | 1.64831 | 33.8 | |
| 26 | −197.882 | | | | |

$f_{10} = 122.8$  $f_{20} = -32.4$  $f_{30} = 86.8$  $f_{40} = 110.0$
$f_{11} = 895.0$  $f_1 = -150.2$  $f_2 = 128.6$  $f_3 = 141.3$
Stop is 0.5 behind $r_{22}$

| f | 70.0 | 130.5 | 243.0 |
|---|---|---|---|
| d5 | 1.74 | 28.99 | 50.43 |
| d11 | 29.18 | 16.82 | 0.74 |
| d16 | 2.88 | 1.05 | 7.67 |
| Bf | 40.83 | 55.03 | 64.49 |
| F No | 3.5 | 4.1 | 4.6 |

$(r_{11} + r_9)/(r_{11} - r_9) = 1.312$
$f_{21}/f_{22} = 0.378$

EXAMPLE 8

$f = 60.4 \sim 209.7$
F-number: $3.5 \sim 4.6$  $k = 0.49 \sim 0.54$

| No. | curvature radius r | center thickness air space between lenses d | refractive index n | Abbe's number ν | |
|---|---|---|---|---|---|
| 1 | 158.176 | 1.99 | 1.74950 | 35.2 | $G_1$ |
| 2 | 59.926 | 7.08 | 1.48749 | 70.2 | |
| 3 | −531.107 | 0.17 | | | |
| 4 | 72.515 | 6.47 | 1.48749 | 70.2 | |
| 5 | −318.820 | (variable) | | | |
| 6 | −375.245 | 1.90 | 1.58144 | 40.8 | $G_2$ |
| 7 | −93.241 | 1.04 | 1.78797 | 47.5 | |
| 8 | 35.662 | 5.26 | | | |
| 9 | −27.871 | 1.04 | 1.51680 | 64.1 | |
| 10 | 57.365 | 3.11 | 1.86074 | 23.0 | |
| 11 | −248.203 | (variable) | | | |
| 12 | 134.364 | 3.54 | 1.53172 | 49.1 | $G_3$ |
| 13 | −77.169 | 0.17 | | | |
| 14 | 75.135 | 5.87 | 1.46450 | 65.8 | |
| 15 | −39.495 | 1.47 | 1.79504 | 28.6 | |
| 16 | −174.489 | (variable) | | | |
| 17 | 44.640 | 6.56 | 1.51823 | 59.0 | $G_4$ |
| 18 | −62.640 | 1.21 | | | |
| 19 | −59.302 | 1.73 | 1.80518 | 25.4 | |
| 20 | −110.434 | 43.57 | | | |
| 21 | −19.816 | 1.99 | 1.74443 | 49.5 | |
| 22 | −34.439 | 0.09 | | | |
| 23 | 182.589 | 2.42 | 1.64831 | 33.8 | |
| 24 | −194.665 | | | | |

$f_{10} = 106.0$  $f_{20} = -28.0$  $f_{30} = 74.9$  $f_{40} = 94.9$
$f_{11} = 768.7$  $f_1 = -129.8$  $f_2 = 110.9$  $f_3 = 121.8$
Stop is 17.22 behind $r_{20}$

| f | 60.4 | 116.5 | 209.7 |
|---|---|---|---|
| d5 | 0.92 | 25.39 | 42.94 |
| d11 | 25.01 | 13.86 | 0.84 |
| d16 | 3.02 | 0.98 | 6.33 |
| Bf | 35.44 | 48.63 | 56.29 |
| F No | 3.5 | 4.1 | 4.6 |

$(r_{11} + r_9)/(r_{11} - r_9) = 1.253$
$f_{21}/f_{22} = 0.342$

EXAMPLE 9

$f = 70.0 \sim 243.0$
F-number: $3.5 \sim 4.6$  $k = 0.47 \sim 0.55$

| No. | curvature radius r | center thickness air space between lenses d | refractive index n | Abbe's number ν | |
|---|---|---|---|---|---|
| 1 | 183.317 | 2.30 | 1.74950 | 35.2 | $G_1$ |
| 2 | 69.451 | 8.20 | 1.48749 | 70.2 | |
| 3 | −615.521 | 0.20 | | | |
| 4 | 83.820 | 7.50 | 1.48749 | 70.2 | |
| 5 | −373.936 | (variable) | | | |
| 6 | −434.886 | 2.20 | 1.58144 | 40.8 | $G_2$ |
| 7 | 108.061 | 1.20 | 1.78797 | 47.5 | |
| 8 | 41.330 | 6.10 | | | |
| 9 | −32.301 | 1.20 | 1.51680 | 64.1 | |
| 10 | 66.383 | 3.60 | 1.86074 | 23.0 | |
| 11 | −288.359 | (variable) | | | |
| 12 | 156.120 | 4.00 | 1.53172 | 49.1 | $G_3$ |
| 13 | −89.323 | 0.20 | | | |
| 14 | 87.077 | 6.80 | 1.46450 | 65.8 | |
| 15 | −45.772 | 1.50 | 1.79504 | 28.6 | |
| 16 | −202.448 | (variable) | | | |
| 17 | 51.503 | 7.60 | 1.51823 | 59.0 | $G_4$ |
| 18 | −73.065 | 1.40 | | | |
| 19 | −69.115 | 1.80 | 1.80518 | 25.4 | |
| 20 | −129.144 | 50.50 | | | |
| 21 | −22.890 | 2.30 | 1.74443 | 49.5 | |
| 22 | −39.701 | 0.10 | | | |
| 23 | 211.610 | 2.80 | 1.64831 | 33.8 | |
| 24 | −229.277 | | | | |

$f_{10} = 122.8$  $f_{20} = -32.4$  $f_{30} = 86.8$  $f_{40} = 110.0$
$f_{11} = 890.9$  $f_1 = -150.5$  $f_2 = 128.5$  $f_3 = 141.2$
Stop is 5.0 behind $r_{20}$

| f | 70.0 | 135.0 | 243.0 |
|---|---|---|---|
| d5 | 1.05 | 29.39 | 49.74 |
| d11 | 29.08 | 16.16 | 1.09 |
| d16 | 3.55 | 1.18 | 7.37 |
| Bf | 41.03 | 56.31 | 65.19 |
| F No | 3.5 | 4.1 | 4.6 |

$(r_{11} + r_9)/(r_{11} - r_9) = 1.252$
$f_{21}/f_{22} = 0.342$

Of the figures showing the aberrations of the examples, those to which A is affixed are aberration diagrams in the wide angle end position, those with affix B are aberration diagrams in the middle position and those with affix C are aberration diagrams in the telephoto end position. The diagrams show spherical aberration, astigmatism, coma and distortion measured using d-line ($\lambda = 587.6$ nm) as the reference wavelength. In the spherical aberration diagrams there are also shown the aberrations for g-line ($\lambda = 435.8$ nm) to show the chromatic spherical aberration.

The aberration diagrams demonstrate that in all of the shown embodiments of the invention, only a very small variation of aberrations is produced with magnification change and among others the variation of coma is extremely small, and that the zoom lenses according to the invention maintain good image-forming performance over the whole magnification changing range.

As readily understood from the foregoing, the present invention has realized a telephoto zoom lens which is compact in construction and able to maintain good optical performance over the whole range of magnification change.

All of the embodiments shown in the above Examples have exhibited the feature that the variation of F-number and therefore the variation of brightness of the lens by zooming is very small for their wide magnification changing range and relatively large zoom ratio (ratio of the focal length in telephoto end position to the focal length in wide angle end position) which was about 3.5 in the examples. Further, the aberration diagrams of all the embodiments have demonstrated that the zoom lenses according to the invention exhibit good and stable image forming performance over the wide zooming range.

I claim:

1. A zoom lens consisting of a first lens group of positive refractive power, a second lens group of negative refractive power, a third lens group of positive refractive power and a fourth lens group of positive refractive power having an aperture stop arranged in the named order from the objective side in which, for the magnification change from wide angle end to telephoto end, the first and fourth lens groups are moved toward the object side and the third lens group is non-linearly moved toward the object side while keeping the second lens group stationary relative to the image plane and in which the second lens group comprises, in the order from the object side, a first cemented lens component composed of positive and negative lens elements cemented together and having a negative composite refractive power and a second cemented lens component composed of negative and positive lens elements cemented together and having a negative composite refractive power and satisfies the following conditions:

$$0.02 < N_5 - N_4 < 0.3 \quad (1)$$

$$0.25 < N_7 - N_6 < 0.4 \quad (2)$$

$$1.05 < (r_{11} + r_9)/(r_{11} - r_9) < 1.45 \quad (3)$$

$$0.3 < f_{21}/f_{22} < 0.5 \quad (4)$$

wherein,
- $f_{21}$ and $f_{22}$ are focal lengths of the first and second cemented lens components;
- $N_4$ and $N_5$ are refractive indexes of the positive and negative lens elements of the first cemented lens component;
- $N_6$ and $N_7$ are refractive indexes of the negative and positive lens elements of the second cemented lens component; and
- $r_9$ and $r_{11}$ are the curvature radii of the lens surfaces on the object side and on the image side of the second cemented lens component.

2. A zoom lens according to claim 1, wherein said first lens group comprises, in the order from the object side, a cemented positive lens component composed of a positive lens element and a negative lens element cemented together, and a positive lens component and that said first lens group satisfies the following conditions:

$$0.05 < f_3/f_{11} < 0.2$$

$$0.5 < (r_3 + r_1)/(r_3 - r_1) < 0.9$$

$$-0.2 < f_{11}\left(\frac{1}{f_1\nu_1} + \frac{1}{f_2\nu_2}\right) < -0.05$$

wherein,
- $f_{11}$ is the focal length of the cemented positive lens component,
- $f_3$ is the focal length of the positive lens component,
- $f_1$ is the focal length of the negative lens element of the cemented positive lens component,
- $f_2$ is the focal length of the positive lens element of the cemented positive,
- $\nu_1$ is Abbe's number of the negative lens element of the cemented positive lens component,
- $\nu_2$ is Abbe's number of said positive lens element of the cemented positive lens component
- $r_1$ is the curvature radius of the lens surface on the object side of the cemented positive lens component, and
- $r_3$ is the curvature radius on the image side of the cemented positive lens component.

3. A zoom lens according to claim 1 as represented by the following data:

| No. | curvature radius r | center thickness air space between lenses d | refractive index n | Abbe's number ν | |
|---|---|---|---|---|---|
| 1 | 158.169 | 1.47 | 1.74950 | 35.2 | G$_1$ |
| 2 | 59.886 | 7.33 | 1.48749 | 70.2 | |
| 3 | −531.005 | 0.17 | | | |
| 4 | 72.905 | 6.90 | 1.48749 | 70.2 | |
| 5 | −311.442 | (variable) | | | |
| 6 | −199.936 | 1.99 | 1.75692 | 31.7 | G$_2$ |
| 7 | −80.887 | 0.78 | 1.80218 | 44.7 | |
| 8 | 38.410 | 4.92 | | | |
| 9 | −29.996 | 0.78 | 1.58913 | 61.2 | |
| 10 | 60.669 | 3.45 | 1.90837 | 23.2 | |
| 11 | −194.902 | (variable) | | | |
| 12 | 133.654 | 3.28 | 1.53172 | 49.1 | G$_3$ |
| 13 | −90.720 | 0.17 | | | |
| 14 | 75.016 | 5.87 | 1.46450 | 65.8 | |
| 15 | −39.498 | 1.29 | 1.79504 | 28.6 | |
| 16 | −141.145 | (variable) | | | |
| 17 | 47.598 | 4.31 | 1.61720 | 54.0 | G$_4$ |
| 18 | −211.249 | 3.37 | | | |
| 19 | −322.764 | 2.76 | 1.46450 | 65.8 | |
| 20 | −61.686 | 1.21 | | | |
| 21 | −61.922 | 1.38 | 1.80518 | 25.4 | |
| 22 | −212.617 | 39.86 | | | |
| 23 | −19.636 | 1.99 | 1.71300 | 54.0 | |
| 24 | −35.614 | 0.09 | | | |
| 25 | 134.054 | 2.42 | 1.64831 | 33.8 | |
| 26 | −178.821 | | | | |
| | Stop is 4.31 behind r$_{22}$ | | | | |
| f | 60.4 | 112.6 | 209.7 | | |
| d5 | 1.20 | 25.11 | 43.21 | | |
| d11 | 25.03 | 14.44 | 0.75 | | |
| d16 | 3.01 | 1.64 | 6.28 | | |
| Bf | 35.35 | 47.30 | 56.36 | | |
| F No | 3.5 | 4.1 | 4.6 | | | f = 60.4~209.7
F-number: 3.5~4.6

$(r_{11} + r_9)/(r_{11} - r_9) = 1.364$
$f_{21}/f_{22} = 0.374$ where G$_1$, G$_2$, G$_3$, and G$_4$ represent the first, second, third, and fourth lens groups, respectively, where f represents the focal length of the whole lens system, and Bf represents the back-focus length.

4. A zoom lens according to claim 1 as represented by the following data:

| | | f = 60.4~209.7 F-number: 3.5~4.6 | | | |
|---|---|---|---|---|---|
| No. | curvature radius r | center thickness air space between lenses d | refractive index n | Abbe's number $\nu$ | |
| 1 | 158.169 | 1.47 | 1.74950 | 35.2 | $G_1$ |
| 2 | 59.886 | 7.33 | 1.48749 | 70.2 | |
| 3 | −531.004 | 0.17 | | | |
| 4 | 73.017 | 6.90 | 1.48749 | 70.2 | |
| 5 | −309.350 | (variable) | | | |
| 6 | −207.292 | 1.99 | 1.69895 | 30.1 | $G_2$ |
| 7 | −77.138 | 0.78 | 1.78797 | 47.5 | |
| 8 | 37.730 | 5.18 | | | |
| 9 | −29.051 | 0.78 | 1.51680 | 64.1 | |
| 10 | 59.175 | 3.54 | 1.90837 | 23.2 | |
| 11 | −480.760 | (variable) | | | |
| 12 | 115.190 | 3.28 | 1.53172 | 49.1 | $G_3$ |
| 13 | −90.119 | 0.17 | | | |
| 14 | 80.274 | 5.87 | 1.46450 | 65.8 | |
| 15 | −38.665 | 1.29 | 1.79504 | 28.6 | |
| 16 | −143.882 | (variable) | | | |
| 17 | 46.938 | 4.49 | 1.56883 | 56.0 | $G_4$ |
| 18 | −157.775 | 3.37 | | | |
| 19 | −260.723 | 2.50 | 1.46450 | 65.8 | |
| 20 | −65.925 | 1.21 | | | |
| 21 | −62.876 | 1.38 | 1.80518 | 25.4 | |
| 22 | −169.462 | 39.864 | | | |
| 23 | −19.804 | 1.99 | 1.71300 | 54.0 | |
| 24 | −35.740 | 0.09 | | | |
| 25 | 134.054 | 2.42 | 1.64831 | 33.8 | |
| 26 | −196.037 | | | | |
| | Stop is 4.31 behind $r_{22}$ | | | | |
| f | 60.4 | 112.6 | 209.7 | | |
| d5 | 1.19 | 25.03 | 43.09 | | |
| d11 | 25.19 | 14.57 | 0.83 | | |
| d16 | 2.70 | 1.40 | 6.12 | | |
| Bf | 35.53 | 47.45 | 56.48 | | |
| F No | 3.5 | 4.1 | 4.6 | | |
| $(r_{11} + r_9)/(r_{11} - r_9) = 1.129$ | | | | | |
| $f_{21}/f_{22} = 0.358$ | | | | | | where $G_1$, $G_2$, $G_3$, and $G_4$ represent the first, second, third, and fourth lens groups, respectively, where f represents the focal length of the whole lens system, and Bf represents the back-focus length.

5. A zoom lens according to claim 1 as represented by the following data:

| | | f = 70.0~243.0 F-number: 3.5~4.6 | | | |
|---|---|---|---|---|---|
| No. | curvature radius r | center thickness air space between lenses d | refractive index n | Abbe's number $\nu$ | |
| 1 | 183.309 | 1.70 | 1.74950 | 35.2 | $G_1$ |
| 2 | 69.405 | 8.50 | 1.48749 | 70.2 | |
| 3 | −615.405 | 0.20 | | | |
| 4 | 84.493 | 8.00 | 1.48749 | 70.2 | |
| 5 | −360.944 | (variable) | | | |
| 6 | −224.070 | 2.30 | 1.69895 | 30.1 | $G_2$ |
| 7 | −93.744 | 0.90 | 1.79668 | 45.5 | |
| 8 | 45.515 | 5.70 | | | |
| 9 | −35.788 | 0.90 | 1.58913 | 61.2 | |
| 10 | 68.881 | 4.00 | 1.90837 | 23.2 | |
| 11 | −266.591 | (variable) | | | |
| 12 | 154.897 | 3.80 | 1.53172 | 49.1 | $G_3$ |
| 13 | −105.139 | 0.20 | | | |
| 14 | 86.939 | 6.80 | 1.46450 | 65.8 | |
| 15 | −45.776 | 1.50 | 1.79504 | 28.6 | |
| 16 | −163.579 | (variable) | | | |
| 17 | 55.261 | 5.00 | 1.61720 | 54.0 | $G_4$ |
| 18 | −244.826 | 3.90 | | | |
| 19 | −374.065 | 3.20 | 1.46450 | 65.8 | |
| 20 | −71.491 | 1.40 | | | |
| 21 | −72.063 | 1.60 | 1.80518 | 25.4 | |
| 22 | −250.476 | 46.20 | | | |
| 23 | −22.757 | 2.30 | 1.71300 | 54.0 | |
| 24 | −41.275 | 0.10 | | | |
| 25 | 155.361 | 2.80 | 1.64831 | 33.8 | |
| 26 | −200.597 | | | | |
| | Stop is 5.0 behind $r_{22}$ | | | | |
| f | 70.0 | 130.5 | 243.0 | | |
| d5 | 1.29 | 28.99 | 49.98 | | |
| d11 | 29.09 | 16.82 | 0.95 | | |
| d16 | 2.76 | 1.17 | 6.55 | | |
| Bf | 41.14 | 54.99 | 65.48 | | |
| F No | 3.5 | 4.1 | 4.6 | | |
| $(r_{11} + r_9)/(r_{11} - r_9) = 1.310$ | | | | | |
| $f_{21}/f_{22} = 0.379$ | | | | | | where $G_1$, $G_2$, $G_3$, and $G_4$ represent the first, second, third, and fourth lens groups, respectively, where f represents the focal length of the whole lens system, and Bf represents the back-focus length.

6. A zoom lens according to claim 1 as represented by the following data:

| | | f = 70.0~243.0 F-number: 3.5~5.2 | | | |
|---|---|---|---|---|---|
| No. | curvature radius r | center thickness air space between lenses d | refractive index n | Abbe's number $\nu$ | |
| 1 | 183.309 | 1.70 | 1.74950 | 35.2 | $G_1$ |
| 2 | 69.405 | 8.50 | 1.48749 | 70.2 | |
| 3 | −615.405 | 0.20 | | | |
| 4 | 85.493 | 8.00 | 1.4879 | 70.2 | |
| 5 | −343.267 | (variable) | | | |
| 6 | −226.836 | 2.33 | 1.68893 | 31.1 | $O_2$ |
| 7 | −94.901 | 0.91 | 1.80218 | 44.7 | |
| 8 | 46.719 | 5.77 | | | |
| 9 | −36.260 | 0.91 | 1.58913 | 61.2 | |
| 10 | 69.934 | 4.05 | 1.90837 | 23.2 | |
| 11 | −269.870 | (variable) | | | |
| 12 | 154.897 | 3.80 | 1.53172 | 49.1 | $G_3$ |
| 13 | −89.928 | 0.20 | | | |
| 14 | 119.596 | 6.80 | 1.46450 | 65.8 | |
| 15 | −45.776 | 1.50 | 1.79504 | 28.6 | |
| 16 | −144.281 | (variable) | | | |
| 17 | 54.151 | 5.00 | 1.61720 | 54.0 | $G_4$ |
| 18 | −234.657 | 3.90 | | | |
| 19 | −374.065 | 3.20 | 1.46450 | 65.8 | |
| 20 | −71.582 | 1.40 | | | |
| 21 | −70.524 | 1.60 | 1.80518 | 25.4 | |
| 22 | −251.710 | 46.20 | | | |
| 23 | −23.530 | 2.30 | 1.71300 | 54.0 | |
| 24 | −41.275 | 0.10 | | | |
| 25 | 824.875 | 2.80 | 1.68893 | 31.1 | |
| 26 | −134.245 | | | | |
| | Stop is 5.0 behind $r_{22}$ | | | | |
| f | 70.0 | 130.5 | 243.0 | | |
| d5 | 1.40 | 25.16 | 45.22 | | |
| d11 | 28.34 | 15.40 | 1.16 | | |
| d16 | 13.95 | 7.88 | 6.07 | | |
| Bf | 39.31 | 58.31 | 74.36 | | |
| F No | 3.6 | 4.5 | 5.2 | | |
| $(r_{11} + r_9)/(r_{11} - r_9) = 1.310$ | | | | | |
| $f_{21}/f_{22} = 0.379$ | | | | | | where $G_1$, $G_2$, $G_3$, and $G_4$ represent the first, second, third, and fourth lens groups, respectively, where f represents the focal length of the whole lens system, and Bf represents the back-focus length.

7. A zoom lens according to claim 1 as represented by the following data:

| f = 70.0~243.0 F-number: 3.7~4.6 center |
|---|

-continued

| No. | curvature radius r | thickness air space between lenses d | refractive index n | Abbe's number ν | |
|---|---|---|---|---|---|
| 1 | 183.309 | 1.70 | 1.74950 | 35.2 | G₁ |
| 2 | 69.405 | 8.50 | 1.48749 | 70.2 | |
| 3 | −615.405 | 0.20 | | | |
| 4 | 84.893 | 8.00 | 1.48749 | 70.2 | |
| 5 | −353.607 | (variable) | | | |
| 6 | −224.234 | 2.30 | 1.69895 | 30.1 | G₂ |
| 7 | −89.087 | 0.89 | 1.79668 | 45.5 | |
| 8 | 44.830 | 5.63 | | | |
| 9 | −35.025 | 0.89 | 1.58913 | 61.2 | |
| 10 | 68.031 | 3.95 | 1.90837 | 23.2 | |
| 11 | −250.284 | (variable) | | | |
| 12 | 154.897 | 3.80 | 1.53172 | 49.1 | G₃ |
| 13 | −107.761 | 0.20 | | | |
| 14 | 78.754 | 6.80 | 1.46450 | 65.8 | |
| 15 | −45.776 | 1.50 | 1.79504 | 28.6 | |
| 16 | −181.056 | (variable) | | | |
| 17 | 55.616 | 5.00 | 1.61720 | 54.0 | G₄ |
| 18 | −240.894 | 3.90 | | | |
| 19 | −374.065 | 3.20 | 1.46450 | 65.8 | |
| 20 | −71.466 | 1.40 | | | |
| 21 | −71.924 | 1.60 | 1.80518 | 25.4 | |
| 22 | −241.850 | 46.20 | | | |
| 23 | −22.284 | 2.30 | 1.69680 | 55.6 | |
| 24 | −44.812 | 0.10 | | | |
| 25 | 155.361 | 2.80 | 1.65128 | 38.2 | |
| 26 | −136.911 | | | | |

Stop is 5.0 behind r₂₂

| f | 70.0 | 130.5 | 243.0 |
|---|---|---|---|
| d5 | 1.39 | 30.86 | 52.09 |
| d11 | 29.67 | 17.83 | 1.52 |
| d16 | 0.74 | 0.79 | 8.61 |
| Bf | 42.01 | 53.80 | 62.29 |
| F No | 3.7 | 4.2 | 4.6 |

$(r_{11} + r_9)/(r_{11} - r_9) = 1.325$
$f_{21}/f_{22} = 0.377$ where $G_1$, $G_2$, $G_3$, and $G_4$ represent the first, second, third, and fourth lens groups, respectively, where f represents the focal length of the whole lens system, and Bf represents the back-focus length.

8. A zoom lens according to claim 1 as represented by the following data:

$f = 60.4 \sim 209.7$
f-number: $3.5 \sim 4.6$

| No. | curvature radius r | center thickness air space between lenses d | refractive index n | Abbe's number ν | |
|---|---|---|---|---|---|
| 1 | 153.568 | 1.47 | 1.80368 | 33.8 | G₁ |
| 2 | 57.615 | 7.33 | 1.51680 | 64.1 | |
| 3 | −1413.023 | 0.17 | | | |
| 4 | 72.986 | 6.39 | 1.51680 | 64.1 | |
| 5 | −280.307 | (variable) | | | |
| 6 | −399.928 | 1.99 | 1.59507 | 35.5 | G₂ |
| 7 | −71.893 | 0.78 | 1.80411 | 46.4 | |
| 8 | 42.140 | 4.66 | | | |
| 9 | −32.681 | 0.78 | 1.58913 | 61.2 | |
| 10 | 53.953 | 3.62 | 1.86074 | 23.0 | |
| 11 | −372.244 | (variable) | | | |
| 12 | 132.871 | 3.37 | 1.67025 | 57.6 | G₃ |
| 13 | −121.027 | 0.86 | | | |
| 14 | 87.297 | 5.78 | 1.51860 | 70.1 | |
| 15 | −42.627 | 0.78 | 1.80368 | 33.8 | |
| 16 | −238.453 | (variable) | | | |
| 17 | 49.071 | 4.06 | 1.69680 | 55.6 | G₄ |
| 18 | −455.672 | 3.37 | | | |
| 19 | −355.293 | 3.02 | 1.51860 | 70.1 | |
| 20 | −64.065 | 1.21 | | | |
| 21 | −63.266 | 1.38 | 1.78470 | 26.1 | |
| 22 | −287.768 | 39.86 | | | |
| 23 | −19.694 | 1.99 | 1.71300 | 54.0 | |
| 24 | −38.656 | 0.09 | | | |
| 25 | 154.955 | 2.42 | 1.64831 | 33.8 | |
| 26 | −110.666 | | | | |

Stop is 4.31 behind r₂₂

| f | 60.4 | 112.6 | 209.7 |
|---|---|---|---|
| d5 | 1.23 | 24.85 | 43.42 |
| d11 | 25.80 | 14.78 | 0.20 |
| d16 | 1.42 | 0.62 | 7.61 |
| Bf | 34.25 | 46.07 | 53.66 |
| F No | 3.5 | 4.1 | 4.6 |

$(r_{11} + r_9)/(r_{11} - r_9) = 1.192$
$f_{21}/f_{22} = 0.448$ where $G_1$, $G_2$, $G_3$, and $G_4$ represents the first, second, third, and fourth lens groups, respectively, where f represents the focal length of the whole lens system, and Bf represents the back-focus length.

9. A zoom lens according to claim 1 as represented by the following data:

$f = 70.0 \sim 243.0$
F-number: $3.5 \sim 4.6$

| No. | curvature radius r | center thickness air space between lenses d | refractive index n | Abbe's number ν | |
|---|---|---|---|---|---|
| 1 | 183.369 | 1.70 | 1.74950 | 35.2 | G₁ |
| 2 | 69.470 | 8.50 | 1.48749 | 70.2 | |
| 3 | −616.150 | 0.20 | | | |
| 4 | 84.464 | 8.00 | 1.48749 | 70.2 | |
| 5 | −361.706 | (variable) | | | |
| 6 | −223.202 | 2.30 | 1.69895 | 30.1 | G₂ |
| 7 | −93.948 | 0.90 | 1.79668 | 45.5 | |
| 8 | 45.471 | 5.70 | | | |
| 9 | −35.786 | 0.90 | 1.58913 | 61.2 | |
| 10 | 68.805 | 4.00 | 1.90837 | 23.2 | |
| 11 | −265.274 | (variable) | | | |
| 12 | 154.694 | 3.80 | 1.53172 | 49.1 | G₃ |
| 13 | −105.111 | 0.20 | | | |
| 14 | 87.068 | 6.80 | 1.46450 | 65.8 | |
| 15 | −45.767 | 1.50 | 1.79504 | 28.6 | |
| 16 | −163.454 | (variable) | | | |
| 17 | 55.180 | 5.00 | 1.61720 | 54.0 | |
| 18 | −246.345 | 3.90 | | | |
| 19 | −374.490 | 3.20 | 1.46450 | 65.8 | G₄ |
| 20 | −71.514 | 1.40 | | | |
| 21 | −72.192 | 1.60 | 1.80518 | 25.4 | |
| 22 | −252.637 | 46.20 | | | |
| 23 | −22.726 | 2.30 | 1.71300 | 54.0 | |
| 24 | −41.204 | 0.10 | | | |
| 25 | 155.945 | 2.80 | 1.64831 | 33.8 | |
| 26 | −197.882 | | | | |

Stop is 5.0 behind r₂₂

| f | 70.0 | 130.5 | 243.0 |
|---|---|---|---|
| d5 | 1.74 | 28.99 | 50.43 |
| d11 | 29.18 | 16.82 | 0.74 |
| d16 | 2.88 | 1.05 | 7.67 |
| Bf | 40.83 | 55.03 | 64.49 |
| F No | 3.5 | 4.1 | 4.6 |

$(r_{11} + r_9)/(r_{11} - r_9) = 1.312$
$f_{21}/f_{22} = 0.378$ where $G_1$, $G_2$, $G_3$, and $G_4$ represent the first, second, third, and fourth lens groups, respectively, where f represents the focal length of the whole lens system, and Bf represents the back-focus length.

10. A zoom lens according to claim 1 as represented by the following data:

$f = 60.4 \sim 209.7$
F-number: $3.5 \sim 4.6$

| curvature | center thickness air space between | refractive | Abbe's |

-continued

| No. | radius r | lenses d | index n | number ν | |
|---|---|---|---|---|---|
| 1 | 158.176 | 1.99 | 1.74950 | 35.2 | $G_1$ |
| 2 | 59.926 | 7.08 | 1.48749 | 70.2 | |
| 3 | 531.107 | 0.17 | | | |
| 4 | 72.515 | 6.47 | 1.48749 | 70.2 | |
| 5 | −318.820 | (variable) | | | |
| 6 | −375.245 | 1.90 | 1.58144 | 40.8 | $G_2$ |
| 7 | −93.241 | 1.04 | 1.78797 | 47.5 | |
| 8 | 35.662 | 5.26 | | | |
| 9 | −27.871 | 1.04 | 1.51680 | 64.1 | |
| 10 | 57.365 | 3.11 | 1.86074 | 23.0 | |
| 11 | −248.203 | (variable) | | | |
| 12 | 134.364 | 3.54 | 1.53172 | 49.1 | $G_3$ |
| 13 | −77.169 | 0.17 | | | |
| 14 | 75.135 | 5.87 | 1.46450 | 65.8 | |
| 15 | −39.495 | 1.47 | 1.79504 | 28.6 | |
| 16 | −174.489 | (variable) | | | |
| 17 | 44.640 | 6.56 | 1.51823 | 59.0 | $G_4$ |
| 18 | −62.640 | 1.21 | | | |
| 19 | −59.302 | 1.73 | 1.80518 | 25.4 | |
| 20 | −110.434 | 43.57 | | | |
| 21 | −19.816 | 1.99 | 1.74443 | 49.5 | |
| 22 | −34.439 | 0.09 | | | |
| 23 | 182.589 | 2.42 | 1.64831 | 33.8 | |
| 24 | −194.665 | | | | |

Stop is 17.22 behind $r_{20}$

| f | 60.4 | 116.5 | 209.7 |
|---|---|---|---|
| d5 | 0.92 | 25.39 | 42.94 |
| d11 | 25.01 | 13.86 | 0.84 |
| d16 | 3.02 | 0.98 | 6.33 |
| Bf | 35.44 | 48.63 | 56.29 |
| F No | 3.5 | 4.1 | 4.6 |

$(r_{11} + r_9)/(r_{11} - r_9) = 1.253$
$f_{21}/f_{22} = 0.342$ where $G_1$, $G_2$, $G_3$, and $G_4$ represent the first, second, third, and fourth lens groups, respectively, where f represents the focal length of the whole lens system, and Bf represents the back-focus length.

11. A zoom lens according to claim 1 as represented by the following data:

$f = 70.0 \sim 243.0$
F-number: 3.5~4.6

| No. | curvature radius r | center thickness air space between lenses d | refractive index n | Abbe's number ν | |
|---|---|---|---|---|---|
| 1 | 183.317 | 2.30 | 1.74950 | 35.2 | $G_1$ |
| 2 | 69.451 | 8.20 | 1.48749 | 70.2 | |
| 3 | −615.521 | 0.20 | | | |
| 4 | 83.820 | 7.50 | 1.48749 | 70.2 | |
| 5 | −373.936 | (variable) | | | |
| 6 | −434.886 | 2.20 | 1.58144 | 40.8 | $G_2$ |
| 7 | 108.061 | 1.20 | 1.78797 | 47.5 | |
| 8 | 41.330 | 6.10 | | | |
| 9 | −32.301 | 1.20 | 1.51680 | 64.1 | |
| 10 | 66.383 | 3.60 | 1.86074 | 23.0 | |
| 11 | −288.359 | (variable) | | | |
| 12 | 156.120 | 4.00 | 1.53172 | 49.1 | $G_3$ |
| 13 | −89.323 | 0.20 | | | |
| 14 | 87.077 | 6.80 | 1.46450 | 65.8 | |
| 15 | −45.772 | 1.50 | 1.79504 | 28.6 | |
| 16 | −202.448 | (variable) | | | |
| 17 | 51.503 | 7.60 | 1.51823 | 59.0 | $G_4$ |
| 18 | −73.065 | 1.40 | | | |
| 19 | −69.115 | 1.80 | 1.80518 | 25.4 | |
| 20 | −129.144 | 50.50 | | | |
| 21 | −22.890 | 2.30 | 1.74443 | 49.5 | |
| 22 | −39.701 | 0.10 | | | |
| 23 | 211.610 | 2.80 | 1.64831 | 33.8 | |
| 24 | −229.277 | | | | |

Stop is 5.0 behind $r_{20}$

| f | 70.0 | 135.0 | 243.0 |
|---|---|---|---|
| d5 | 1.05 | 29.39 | 49.74 |
| d11 | 29.08 | 16.16 | 1.09 |
| d16 | 3.55 | 1.18 | 7.37 |
| Bf | 41.03 | 56.31 | 65.19 |
| F No | 3.5 | 4.1 | 4.6 |

$(r_{11} + r_9)/(r_{11} - r_9) = 1.252$
$f_{21}/f_{22} = 0.342$ where $G_1$, $G_2$, $G_3$, and $G_4$ represent the first, second, third, and fourth lens groups, respectively, where f represents the focal length of the whole lens system, and Bf represents the back-focus length.

12. A zoom lens consisting of a first lens group of positive refractive power, a second lens group of negative refractive power, a third lens group of positive refractive power and a fourth lens group of positive refractive power having an aperture stop arranged in the named order from the objective side in which, for the magnification change from wide angle end to telephoto end, the first lens group is moved toward the object side linearly, the fourth lens group is moved toward the object side and the third lens group is moved toward the object side non-linearly while keeping the second lens group stationary relative to the image plane and which satisfies the following conditions:

$$x_4 = k \cdot x_1$$

$$0.4 \leqq k \leqq 0.8$$

wherein, $x_1$ is the amount of displacement of the first lens group at the change in the direction from wide angle end to telephoto end and $x_4$ is the amount of the displacement of the fourth lens group at the time.

13. A zoom lens according to claim 12 which satisfies the following conditions:

$$1.5 < f_{10}/f_w < 2.5$$

$$0.35 < |f_{20}/f_w| < 0.55$$

$$1.0 < f_{30}/f_w < 1.4$$

$$1.4 < f_{40}/f_w < 1.7$$

wherein, $f_{10}$, $f_{20}$, $f_{30}$ and $f_{40}$ are focal lengths of the first, second, third and fourth lens groups respectively, fw is the composite focal length of the whole system in the wide angle end position.

14. A zoom lens according to claim 12 as represented by the following data:

$f = 60.4 \sim 209.7$
F-number: 3.5~4.6    $k = 0.5$

| No. | curvature radius r | center thickness air space between lenses d | refractive index n | Abbe's number ν | |
|---|---|---|---|---|---|
| 1 | 158.169 | 1.47 | 1.74950 | 35.2 | $G_1$ |
| 2 | 59.886 | 7.33 | 1.48749 | 70.2 | |
| 3 | −531.005 | 0.17 | | | |
| 4 | 72.905 | 6.90 | 1.48749 | 70.2 | |
| 5 | −311.442 | (variable) | | | |
| 6 | −199.936 | 1.99 | 1.75692 | 31.7 | $G_2$ |
| 7 | −80.887 | 0.78 | 1.80218 | 44.7 | |
| 8 | 38.410 | 4.92 | | | |
| 9 | −29.996 | 0.78 | 1.58913 | 61.2 | |
| 10 | 60.669 | 3.45 | 1.90837 | 23.2 | |
| 11 | −194.902 | (variable) | | | |
| 12 | 133.654 | 3.28 | 1.53172 | 49.1 | $G_3$ |

-continued

| | | | | |
|---|---|---|---|---|
| 13 | −90.720 | 0.17 | | |
| 14 | 75.016 | 5.87 | 1.46450 | 65.8 |
| 15 | −39.498 | 1.29 | 1.79504 | 28.6 |
| 16 | −141.145 | (variable) | | |
| 17 | 47.598 | 4.31 | 1.61720 | 54.0 G$_4$ |
| 18 | −211.249 | 3.37 | | |
| 19 | −322.764 | 2.76 | 1.46450 | 65.8 |
| 20 | −61.686 | 1.21 | | |
| 21 | −61.922 | 1.38 | 1.80518 | 25.4 |
| 22 | −212.617 | 39.86 | | |
| 23 | −19.636 | 1.99 | 1.71300 | 54.0 |
| 24 | −35.614 | 0.09 | | |
| 25 | 134.054 | 2.42 | 1.64831 | 33.8 |
| 26 | −178.821 | | | |

$f_{10} = 106.0$  $f_{20} = -28.0$  $f_{30} = 74.9$  $f_{40} = 94.9$
Stop is 4.31 behind $r_{22}$

| | | | |
|---|---|---|---|
| f | 60.4 | 112.6 | 209.7 |
| d5 | 1.20 | 25.11 | 43.21 |
| d11 | 25.03 | 14.44 | 0.75 |
| d16 | 3.01 | 1.64 | 6.28 |
| Bf | 35.35 | 47.30 | 56.36 |
| F No | 3.5 | 4.1 | 4.6 |

$(r_{11} + r_9)/(r_{11} - r_9) = 1.364$ where G$_1$, G$_2$, G$_3$, and G$_4$ represent the first, second, third, and fourth lens groups, respectively, where f represents the focal length of the whole lens system, and Bf represents the back-focus length.

15. A zoom lens according to claim 12 as represented by the following data:

$f = 60.4 \sim 209.7$
F-number: 3.5~4.6   $k = 0.5$

| No. | curvature radius r | center thickness air space between lenses d | refractive index n | Abbe's number ν | |
|---|---|---|---|---|---|
| 1 | 158.169 | 1.47 | 1.74950 | 35.2 | G$_1$ |
| 2 | 59.886 | 7.33 | 1.48749 | 70.2 | |
| 3 | −531.004 | 0.17 | | | |
| 4 | 73.017 | 6.90 | 1.48749 | 70.2 | |
| 5 | −309.350 | (variable) | | | |
| 6 | −207.292 | 1.99 | 1.69895 | 30.1 | G$_2$ |
| 7 | −77.138 | 0.78 | 1.78797 | 47.5 | |
| 8 | 37.730 | 5.18 | | | |
| 9 | −29.051 | 0.78 | 1.51680 | 64.1 | |
| 10 | 59.175 | 3.54 | 1.90837 | 23.2 | |
| 11 | −480.760 | (variable) | | | |
| 12 | 115.190 | 3.28 | 1.53172 | 49.1 | G$_3$ |
| 13 | −90.119 | 0.17 | | | |
| 14 | 80.274 | 5.87 | 1.46450 | 65.8 | |
| 15 | −38.665 | 1.29 | 1.79504 | 28.6 | |
| 16 | −143.882 | (variable) | | | |
| 17 | 46.938 | 4.49 | 1.56883 | 56.0 | G$_4$ |
| 18 | −157.775 | 3.37 | | | |
| 19 | −260.723 | 2.50 | 1.46450 | 65.8 | |
| 20 | −65.925 | 1.21 | | | |
| 21 | −62.876 | 1.38 | 1.80518 | 25.4 | |
| 22 | −169.462 | 39.864 | | | |
| 23 | −19.804 | 1.99 | 1.71300 | 54.0 | |
| 24 | −35.740 | 0.09 | | | |
| 25 | 134.054 | 2.42 | 1.64831 | 33.8 | |
| 26 | −196.037 | | | | |

$f_{10} = 106.0$  $f_{20} = -28.0$  $f_{30} = 74.9$  $f_{40} = 94.9$
Stop is 4.31 behind $r_{22}$

| | | | |
|---|---|---|---|
| f | 60.4 | 112.6 | 209.7 |
| d5 | 1.19 | 25.03 | 43.09 |
| d11 | 25.19 | 14.57 | 0.83 |
| d16 | 2.70 | 1.40 | 6.12 |
| Bf | 35.53 | 47.45 | 56.48 |
| F No | 3.5 | 4.1 | 4.6 |

$(r_{11} + r_9)/(r_{11} - r_9) = 1.129$ where G$_1$, G$_2$, G$_3$, and G$_4$ represent the first, second, third, and fourth lens groups, respectively, where f represents the focal length of the whole lens system, and Bf represents the back-focus length.

16. A zoom lens according to claim 12 as represented by the following data:

$f = 70.0 \sim 243.0$
F-number: 3.5~4.6   $k = 0.5$

| No. | curvature radius r | center thickness air space between lenses d | refractive index n | Abbe's number ν | |
|---|---|---|---|---|---|
| 1 | 183.309 | 1.70 | 1.74950 | 35.2 | G$_1$ |
| 2 | 69.405 | 8.50 | 1.48749 | 70.2 | |
| 3 | −615.405 | 0.20 | | | |
| 4 | 84.493 | 8.00 | 1.48749 | 70.2 | |
| 5 | −360.944 | (variable) | | | |
| 6 | −224.070 | 2.30 | 1.69895 | 30.1 | G$_2$ |
| 7 | −93.744 | 0.90 | 1.79668 | 45.5 | |
| 8 | 45.515 | 5.70 | | | |
| 9 | −35.788 | 0.90 | 1.58913 | 61.2 | |
| 10 | 68.881 | 4.00 | 1.90837 | 23.2 | |
| 11 | −266.591 | (variable) | | | |
| 12 | 154.897 | 3.80 | 1.53172 | 49.1 | G$_3$ |
| 13 | −105.139 | 0.20 | | | |
| 14 | 86.939 | 6.80 | 1.46450 | 65.8 | |
| 15 | −45.776 | 1.50 | 1.79504 | 28.6 | |
| 16 | −163.579 | (variable) | | | |
| 17 | 55.261 | 5.00 | 1.61720 | 54.0 | G$_4$ |
| 18 | −244.826 | 3.90 | | | |
| 19 | −374.065 | 3.20 | 1.46450 | 65.8 | |
| 20 | −71.491 | 1.40 | | | |
| 21 | −72.063 | 1.60 | 1.80518 | 25.4 | |
| 22 | −250.476 | 46.20 | | | |
| 23 | −22.757 | 2.30 | 1.71300 | 54.0 | |
| 24 | −41.275 | 0.10 | | | |
| 25 | 155.361 | 2.80 | 1.64831 | 33.8 | |
| 26 | −200.597 | | | | |

$f_{10} = 122.8$  $f_{20} = -32.4$  $f_{30} = 86.8$  $f_{40} = 110.0$
Stop is 5.0 behind $r_{22}$

| | | | |
|---|---|---|---|
| f | 70.0 | 130.5 | 243.0 |
| d5 | 1.29 | 28.99 | 49.98 |
| d11 | 29.09 | 16.82 | 0.95 |
| d16 | 2.76 | 1.17 | 6.55 |
| Bf | 41.14 | 54.99 | 65.48 |
| F No | 3.5 | 4.1 | 4.6 |

$(r_{11} + r_9)/(r_{11} - r_9) = 1.310$ where G$_1$, G$_2$, G$_3$, and G$_4$ represent the first, second, third, and fourth lens groups, respectively, where f represents the focal length of the whole lens system, and Bf represents the back-focus length.

17. A zoom lens according to claim 12 as represented by the following data:

$f = 70.0 \sim 243.0$
F-number: 3.5~5.2   $k = 0.8$

| No. | curvature radius r | center thickness air space between lenses d | refractive index n | Abbe's number ν | |
|---|---|---|---|---|---|
| 1 | 183.309 | 1.70 | 1.74950 | 35.2 | G$_1$ |
| 2 | 69.405 | 8.50 | 1.48749 | 70.2 | |
| 3 | −615.405 | 0.20 | | | |
| 4 | 85.493 | 8.00 | 1.48749 | 70.2 | |
| 5 | −343.267 | (variable) | | | |
| 6 | −226.836 | 2.33 | 1.68893 | 31.1 | G$_2$ |
| 7 | −94.901 | 0.91 | 1.80218 | 44.7 | |
| 8 | 46.719 | 5.77 | | | |
| 9 | −36.260 | 0.91 | 1.58913 | 61.2 | |
| 10 | 69.934 | 4.05 | 1.90837 | 23.2 | |
| 11 | −269.870 | (variable) | | | |
| 12 | 154.897 | 3.80 | 1.53172 | 49.1 | G$_3$ |
| 13 | −89.928 | 0.20 | | | |
| 14 | 119.596 | 6.80 | 1.46450 | 65.8 | |
| 15 | −45.776 | 1.50 | 1.79504 | 28.6 | |
| 16 | −144.281 | (variable) | | | |

-continued-

| | | | | | |
|---|---|---|---|---|---|
| 17 | 54.151 | 5.00 | 1.61720 | 54.0 | G₄ |
| 18 | −234.657 | 3.90 | | | |
| 19 | −374.065 | 3.20 | 1.46450 | 65.8 | |
| 20 | −71.582 | 1.40 | | | |
| 21 | −70.524 | 1.60 | 1.80518 | 25.4 | |
| 22 | −251.710 | 46.20 | | | |
| 23 | −23.530 | 2.30 | 1.71300 | 54.0 | |
| 24 | −41.275 | 0.10 | | | |
| 25 | 824.875 | 2.80 | 1.68893 | 31.1 | |
| 26 | −134.245 | | | | |

$f_{10} = 122.8$  $f_{20} = -32.8$  $f_{30} = 86.8$  $f_{40} = 110.0$
Stop is 5.0 behind $r_{22}$

| | | | |
|---|---|---|---|
| f | 70.0 | 130.5 | 243.0 |
| d5 | 1.40 | 25.16 | 45.22 |
| d11 | 28.34 | 15.40 | 1.16 |
| d16 | 13.95 | 7.88 | 6.07 |
| Bf | 39.31 | 58.31 | 74.36 |
| F No | 3.6 | 4.5 | 5.2 |

$(r_{11} + r_9)/(r_{11} - r_9) = 1.310$ where $G_1$, $G_2$, $G_3$, and $G_4$ represent the first, second, third, and fourth lens groups, respectively, where f represents the focal length of the whole lens system, and Bf represents the back-focus length.

18. A zoom lens according to claim 12 as represented by the following data:

$f = 70.0 \sim 243.0$
F-number: $3.7 \sim 4.6$    $k = 0.4$

| No. | curvature radius r | center thickness air space between lenses d | refractive index n | Abbe's number ν | |
|---|---|---|---|---|---|
| 1 | 183.309 | 1.70 | 1.74950 | 35.2 | G₁ |
| 2 | 69.405 | 8.50 | 1.48749 | 70.2 | |
| 3 | −615.405 | 0.20 | | | |
| 4 | 84.893 | 8.00 | 1.48749 | 70.2 | |
| 5 | −353.607 | (variable) | | | |
| 6 | −224.234 | 2.30 | 1.69895 | 30.1 | G₂ |
| 7 | −89.087 | 0.89 | 1.79668 | 45.5 | |
| 8 | 44.830 | 5.63 | | | |
| 9 | −35.025 | 0.89 | 1.58913 | 61.2 | |
| 10 | 68.031 | 3.95 | 1.90837 | 23.2 | |
| 11 | −250.284 | (variable) | | | |
| 12 | 154.897 | 3.80 | 1.53172 | 49.1 | G₃ |
| 13 | −107.761 | 0.20 | | | |
| 14 | 78.754 | 6.80 | 1.46450 | 65.8 | |
| 15 | −45.776 | 1.50 | 1.79504 | 28.6 | |
| 16 | −181.056 | (variable) | | | |
| 17 | 55.616 | 5.00 | 1.61720 | 54.0 | G₄ |
| 18 | −240.894 | 3.90 | | | |
| 19 | −374.065 | 3.20 | 1.46450 | 65.8 | |
| 20 | −71.466 | 1.40 | | | |
| 21 | −71.924 | 1.60 | 1.80518 | 25.4 | |
| 22 | −241.850 | 46.20 | | | |
| 23 | −22.284 | 2.30 | 1.69680 | 55.6 | |
| 24 | −44.812 | 0.10 | | | |
| 25 | 155.361 | 2.80 | 1.65128 | 38.2 | |
| 26 | −136.911 | | | | |

$f_{10} = 122.8$  $f_{20} = -32.0$  $f_{30} = 86.8$  $f_{40} = 110.0$
Stop is 5.0 behind $r_{22}$

| | | | |
|---|---|---|---|
| f | 70.0 | 130.5 | 243.0 |
| d5 | 1.39 | 30.86 | 52.09 |
| d11 | 29.67 | 17.83 | 1.52 |
| d16 | 0.74 | 0.79 | 8.61 |
| Bf | 42.01 | 53.80 | 62.29 |
| F No | 3.7 | 4.2 | 4.6 |

$(r_{11} + r_9)/(r_{11} - r_9) = 1.325$ where $G_1$, $G_2$, $G_3$, and $G_4$ represent the first, second, third, and fourth lens groups, respectively, where f represents the focal length of the whole lens system, and Bf represents the back-focus length.

19. A zoom lens according to claim 12 as represented by the following data:

$f = 60.4 \sim 209.7$
F-number: $3.5 \sim 4.6$    $k = 0.46 \sim 0.5$

| No. | curvature radius r | center thickness air space between lenses d | refractive index n | Abbe's number ν | |
|---|---|---|---|---|---|
| 1 | 153.568 | 1.47 | 1.80368 | 33.8 | G₁ |
| 2 | 57.615 | 7.33 | 1.51680 | 64.1 | |
| 3 | −1413.023 | 0.17 | | | |
| 4 | 72.986 | 6.39 | 1.51680 | 64.1 | |
| 5 | −280.307 | (variable) | | | |
| 6 | −399.928 | 1.99 | 1.59507 | 35.5 | G₂ |
| 7 | −71.893 | 0.78 | 1.80411 | 46.4 | |
| 8 | 42.140 | 4.66 | | | |
| 9 | −32.681 | 0.78 | 1.58913 | 61.2 | |
| 10 | 53.953 | 3.62 | 1.86074 | 23.0 | |
| 11 | −372.244 | (variable) | | | |
| 12 | 132.871 | 3.37 | 1.67025 | 57.6 | G₃ |
| 13 | −121.027 | 0.86 | | | |
| 14 | 87.297 | 5.78 | 1.51860 | 70.1 | |
| 15 | −42.627 | 0.78 | 1.80368 | 33.8 | |
| 16 | −238.453 | (variable) | | | |
| 17 | 49.071 | 4.06 | 1.69680 | 55.6 | G₄ |
| 18 | −455.672 | 3.37 | | | |
| 19 | −355.293 | 3.02 | 1.51860 | 70.1 | |
| 20 | −64.065 | 1.21 | | | |
| 21 | −63.266 | 1.38 | 1.78470 | 26.1 | |
| 22 | −287.768 | 39.86 | | | |
| 23 | −19.694 | 1.99 | 1.71300 | 54.0 | |
| 24 | −38.656 | 0.09 | | | |
| 25 | 154.955 | 2.42 | 1.64831 | 33.8 | |
| 26 | −110.666 | | | | |

$f_{10} = 105.8$  $f_{20} = -28.5$  $f_{30} = 75.2$  $f_{40} = 94.9$
Stop is 4.31 behind $r_{22}$

| | | | |
|---|---|---|---|
| f | 60.4 | 112.6 | 209.7 |
| d5 | 1.23 | 24.85 | 43.42 |
| d11 | 25.80 | 14.78 | 0.20 |
| d16 | 1.42 | 0.62 | 7.61 |
| Bf | 34.25 | 46.07 | 53.66 |
| F No | 3.5 | 4.1 | 4.6 |

$(r_{11} + r_9)/(r_{11} - r_9) = 1.192$ where $G_1$, $G_2$, $G_3$, and $G_4$ represent the first, second, third, and fourth lens groups, respectively, where f represents the focal length of the whole lens system, and Bf represents the back-focus length.

20. A zoom lens according to claim 12 as represented by the following data:

$f = 70.0 \sim 243.0$
F-number: $3.5 \sim 4.6$    $k = 0.47 \sim 0.55$

| No. | curvature radius r | center thickness air space between lenses d | refractive index n | Abbe's number ν | |
|---|---|---|---|---|---|
| 1 | 183.369 | 1.70 | 1.74950 | 35.2 | G₁ |
| 2 | 69.470 | 8.50 | 1.48749 | 70.2 | |
| 3 | −616.150 | 0.20 | | | |
| 4 | 84.464 | 8.00 | 1.48749 | 70.2 | |
| 5 | −361.706 | (variable) | | | |
| 6 | −223.202 | 2.30 | 1.69895 | 30.1 | G₂ |
| 7 | −93.948 | 0.90 | 1.79668 | 45.5 | |
| 8 | 45.471 | 5.70 | | | |
| 9 | −35.786 | 0.90 | 1.58913 | 61.2 | |
| 10 | 68.805 | 4.00 | 1.90837 | 23.2 | |
| 11 | −265.274 | (variable) | | | |
| 12 | 154.694 | 3.80 | 1.53172 | 49.1 | G₃ |
| 13 | −105.111 | 0.20 | | | |
| 14 | 87.068 | 6.80 | 1.46450 | 65.8 | |
| 15 | −45.767 | 1.50 | 1.79504 | 28.6 | |
| 16 | −163.454 | (variable) | | | |
| 17 | 55.180 | 5.00 | 1.61720 | 54.0 | G₄ |
| 18 | −246.345 | 3.90 | | | |
| 19 | −374.490 | 3.20 | 1.46450 | 65.8 | |
| 20 | −71.514 | 1.40 | | | |
| 21 | −72.192 | 1.60 | 1.80518 | 25.4 | |

-continued

| | | | | |
|---|---|---|---|---|
| 22 | −252.637 | 46.20 | | |
| 23 | −22.726 | 2.30 | 1.71300 | 54.0 |
| 24 | −41.204 | 0.10 | | |
| 25 | 155.945 | 2.80 | 1.64831 | 33.8 |
| 26 | −197.882 | | | |

$f_{10} = 122.8$  $f_{20} = -32.4$  $f_{30} = 86.8$  $f_{40} = 110.0$
Stop is 5.0 behind $r_{22}$

| f | 70.0 | 130.5 | 243.0 |
|---|---|---|---|
| d5 | 1.74 | 28.99 | 50.43 |
| d11 | 29.18 | 16.82 | 0.74 |
| d16 | 2.88 | 1.05 | 7.67 |
| Bf | 40.83 | 55.03 | 64.49 |
| F No | 3.5 | 4.1 | 4.6 |

$(r_{11} + r_9)/(r_{11} - r_9) = 1.312$ where $G_1$, $G_2$, $G_3$, and $G_4$ represent the first, second, third, and fourth lens groups, respectively, where f represents the focal length of the whole lens system, and Bf represents the back-focus length.

21. A zoom lens according to claim 12 as represented by the following data:

$f = 60.4 \sim 209.7$
F-number: $3.5 \sim 4.6$    $k = 0.49 \sim 0.54$

| No. | curvature radius r | center thickness air space between lenses d | refractive index n | Abbe's number $\nu$ | |
|---|---|---|---|---|---|
| 1 | 158.176 | 1.99 | 1.74950 | 35.2 | $G_1$ |
| 2 | 59.926 | 7.08 | 1.48749 | 70.2 | |
| 3 | −531.107 | 0.17 | | | |
| 4 | 72.515 | 6.47 | 1.48749 | 70.2 | |
| 5 | −318.820 | (variable) | | | |
| 6 | −375.245 | 1.90 | 1.58144 | 40.8 | $G_2$ |
| 7 | −93.241 | 1.04 | 1.78797 | 47.5 | |
| 8 | 35.662 | 5.26 | | | |
| 9 | −27.871 | 1.04 | 1.51680 | 64.1 | |
| 10 | 57.365 | 3.11 | 1.86074 | 23.0 | |
| 11 | −248.203 | (variable) | | | |
| 12 | 134.364 | 3.54 | 1.53172 | 49.1 | $G_3$ |
| 13 | −77.169 | 0.17 | | | |
| 14 | 75.135 | 5.87 | 1.46450 | 65.8 | |
| 15 | −39.495 | 1.47 | 1.79504 | 28.6 | |
| 16 | −174.489 | (variable) | | | |
| 17 | 44.640 | 6.56 | 1.51823 | 59.0 | $G_4$ |
| 18 | −62.640 | 1.21 | | | |
| 19 | −59.302 | 1.73 | 1.80518 | 25.4 | |
| 20 | −110.434 | 43.57 | | | |
| 21 | −19.816 | 1.99 | 1.74443 | 49.5 | |
| 22 | −34.439 | 0.09 | | | |
| 23 | 182.589 | 2.42 | 1.64831 | 33.8 | |
| 24 | −194.665 | | | | |

$f_{10} = 106.0$  $f_{20} = -28.0$  $f_{30} = 74.9$  $f_{40} = 94.9$
Stop is 17.22 behind $r_{20}$

| f | 60.4 | 116.5 | 209.7 |
|---|---|---|---|
| d5 | 0.92 | 25.39 | 42.94 |
| d11 | 25.01 | 13.86 | 0.84 |
| d16 | 3.02 | 0.98 | 6.33 |
| Bf | 35.44 | 48.63 | 56.29 |
| F No | 3.5 | 4.1 | 4.6 |

$(r_{11} + r_9)/(r_{11} - r_9) = 1.253$ where $G_1$, $G_2$, $G_3$, and $G_4$ represent the first, second, third, and fourth lens groups, respectively, where f represents the focal length of the whole lens system, and Bf represents the back-focus length.

22. A zoom lens according to claim 12, wherein said fourth lens group is moved linearly at the magnification change from wide angle end to telephoto end.

23. A zoom lens according to claim 13 as represented by the following data:

$f = 70.0 \sim 243.0$
F-number: $3.5 \sim 4.6$    $k = 0.47 \sim 0.55$

| No. | curvature radius r | center thickness air space between lenses d | refractive index n | Abbe's number $\nu$ | |
|---|---|---|---|---|---|
| 1 | 183.317 | 2.30 | 1.74950 | 35.2 | $G_1$ |
| 2 | 69.451 | 8.20 | 1.48749 | 70.2 | |
| 3 | −615.521 | 0.20 | | | |
| 4 | 83.820 | 7.50 | 1.48749 | 70.2 | |
| 5 | −373.936 | (variable) | | | |
| 6 | −434.886 | 2.20 | 1.58144 | 40.8 | $G_2$ |
| 7 | 108.061 | 1.20 | 1.78797 | 47.5 | |
| 8 | 41.330 | 6.10 | | | |
| 9 | −32.301 | 1.20 | 1.51680 | 64.1 | |
| 10 | 66.383 | 3.60 | 1.86074 | 23.0 | |
| 11 | −288.359 | (variable) | | | |
| 12 | 156.120 | 4.00 | 1.53172 | 49.1 | $G_3$ |
| 13 | −89.323 | 0.20 | | | |
| 14 | 87.077 | 6.80 | 1.46450 | 65.8 | |
| 15 | −45.772 | 1.50 | 1.79504 | 28.6 | |
| 16 | −202.448 | (variable) | | | |
| 17 | 51.503 | 7.60 | 1.51823 | 59.0 | $G_4$ |
| 18 | −73.065 | 1.40 | | | |
| 19 | −69.115 | 1.80 | 1.80518 | 25.4 | |
| 20 | −129.144 | 50.50 | | | |
| 21 | −22.890 | 2.30 | 1.74443 | 49.5 | |
| 22 | −39.701 | 0.10 | | | |
| 23 | 211.610 | 2.80 | 1.64831 | 33.8 | |
| 24 | −229.277 | | | | |

$f_{10} = 122.8$  $f_{20} = -32.4$  $f_{30} = 86.8$  $f_{40} = 110.0$
Stop is 0.5 behind $r_{20}$

| f | 70.0 | 135.0 | 243.0 |
|---|---|---|---|
| d5 | 1.05 | 29.39 | 49.74 |
| d11 | 29.08 | 16.16 | 1.09 |
| d16 | 3.55 | 1.18 | 7.37 |
| Bf | 41.03 | 56.31 | 65.19 |
| F No | 3.5 | 4.1 | 4.6 |

$(r_{11} + r_9)/(r_{11} - r_9) = 1.252$ where $G_1$, $G_2$, $G_3$, and $G_4$ represent the first, second, third, and fourth lens groups, respectively, where f represents the focal length of the whole lens system, and Bf represents the back-focus length.

* * * * *